United States Patent [19]
Nakamura et al.

[11] Patent Number: 6,000,982
[45] Date of Patent: Dec. 14, 1999

[54] METHOD OF MANUFACTURING A COLD-CATHODE FOR A DISCHARGE DEVICE

[75] Inventors: Osamu Nakamura, Tachikawa; Shigemi Suzuki, Yokohama, both of Japan

[73] Assignees: Casio Computer Co., Ltd.; Stanley Electric Co., Ltd., both of Tokyo, Japan

[21] Appl. No.: 09/229,823

[22] Filed: Jan. 13, 1999

Related U.S. Application Data

[62] Division of application No. 08/686,182, Jul. 23, 1996, Pat. No. 5,905,334.

[30] Foreign Application Priority Data

Jul. 31, 1995 [JP] Japan .................................. 7-213007
Apr. 2, 1996 [JP] Japan .................................. 8-102005

[51] Int. Cl.⁶ .................................................. H01J 9/02
[52] U.S. Cl. ................................ 445/51; 427/77; 445/26
[58] Field of Search ............................ 445/51, 58, 26; 427/78, 77

[56] References Cited

U.S. PATENT DOCUMENTS

| | | |
|---|---|---|
| 3,869,312 | 3/1975 | Moss et al. ............................ 427/78 |
| 4,136,227 | 1/1979 | Saito et al. . |
| 4,864,191 | 9/1989 | Van De Weijer et al. . |
| 5,111,108 | 5/1992 | Goodman et al. . |

FOREIGN PATENT DOCUMENTS 60-264039  12/1985  Japan .

*Primary Examiner*—Kenneth J. Ramsey
*Attorney, Agent, or Firm*—Frihauf, Holtz, Goodman, Langer & Chick, P.C.

[57] ABSTRACT

A method of manufacturing a cold-cathode for a discharging device by forming a film containing a rare earth element on a base plate; and oxidizing said rare earth element of said film. The oxidizing step can be accomplished by heating the rare earth element of said film in a gas atmosphere containing oxygen and/or oxygen-containing substance in a concentration of 1% or less by volume.

12 Claims, 26 Drawing Sheets

AB TYPE (INTERMEDIATE BETWEEN A TYPE AND B TYPE)

METHOD OF MANUFACTURING A COLD-CATHODE FOR A DISCHARGE DEVICE

This is a division of application Ser. No. 08/686,182 filed Jul. 23, 1996, now U.S. Pat. No. 5,905,334.

BACKGROUND OF THE INVENTION

1. Field of the Invention

The present invention relates to an electrode which emits electrons when a high electric field is applied to it, a method of manufacturing the electrode, and an electron-emitting device incorporating the electrode.

2. Description of the Related Art

Electrodes are known which emit electrons when a high electric filed is applied to them. These electrodes, generally known as "electron-emitting electrodes," are shaped like a needle or a plate, unlike hot cathodes which are coiled filaments and which emit electrons when a current flows through them to heat them. An electron-emitting electrode emits electrons from its surface by virtue of tunnel effect when a high voltage of about $10^7$ V/cm or more is applied to it. They are used as cathodes in copying apparatuses, in cold-cathode fluorescent lamps employed as the back lights of non-self-emission displays (e.g., liquid crystal displays), in monochromatic or color display displays, in a plasma displays, in VFDs (Vacuum Fluorescent Displays), and in similar apparatuses.

A cold-cathode fluorescent lamp equipped with an electron-emitting electrode comprises a tube which has a fluorescent layer coated on its inner surface and which is filled with a mixture rare gas and mercury vapor. The electrons emitted from the electrodes impinge upon the mercury atoms in the tube so that, ultraviolet rays are generated. The ultraviolet rays excite the fluorescent layer. Thus excited, the fluorescent layer emits visible light.

Electron-emitting electrodes are made of metal having a small work function, such as nickel (Ni), molybdenum (Mo) or the like. Generally, the smaller the diameter of a cold-cathode fluorescent lamp having an electron-emitting electrode made of such metal, the higher the luminance (cd/m$^2$) of the light the lamp generates. The cold-cathode fluorescent lamp can be thin and can emit intense light. It is therefore suitable for use as a back light in liquid crystal displays.

However, the voltage applied to the cold-cathode fluorescent lamp must be increased to enable the lamp to emit light of higher luminance. Consequently, the lamp consumes much power. If the lamp is used in a battery-driven portable display, the display cannot operate for a long time. The cold-cathode fluorescent lamp with electron-emitting electrodes is disadvantageous in another respect. As discharge proceeds, the material of electrode is gradually sputtered, inevitably contaminating the inner surface of the tube and shortening the lifetime of the electron-emitting electrode.

Various materials of electron-emitting electrodes have been proposed. Various limitations are imposed on the material for an electron-emitting electrode, however. For example, insulating materials that greatly prevent tunneling cannot be used in a cold cathode wherein tunnel effect is utilized.

SUMMARY OF THE INVENTION

A first object of the present invention is to provide an electron-emitting electrode which can operate at a low discharge voltage and in which the sputtering of the electron-emitting film can be inhibited.

To achieve the first object, the electron-emitting electrode of the invention comprises a base plate made of electrically conductive material or semiconductor material and an electron-emitting film provided on the base plate, containing $R_2O_{3-z}$ (where R is an atom or an atom group of rare earth elements, and O is oxygen, and z is 0.0 to 1.0), for performing either field emission of electrons or cold emission of electrons. Here, "atom group" means a group of rare earth elements of different types. Owing to the electron-emitting film containing $R_2O_{3-z}$, the electrode can emit electrons at a lower voltage. The film is hardly sputtered while emitting electrons. The electron-emitting electrode therefore has a long lifetime.

A second object of this invention is to provide a method of manufacturing an electron-emitting electrode which requires but a low discharge voltage and in which the sputtering of the electron-emitting film can be inhibited.

To attain the second object, the method according to the invention comprises the steps of: forming on a base plate a film containing a rare earth element; and heating the film in an oxygen atmosphere or a gas atmosphere containing oxygen in a concentration of 1% or less by volume, thereby forming a rare-earth oxide film.

Among rare-earth oxides are some which can hardly be reduced. To control the crystal systems of such oxides is difficult. Nevertheless, the crystal system of a rare-earth oxide film can be controlled, provided that the film has been formed by heating a film of a rare earth element in a gas atmosphere containing oxygen or oxide in a concentration of 1% or less by volume. Hence, it is possible to provide a rare-earth oxide film which emits electrons at a low discharge voltage and which has a low sputtering property, by changing the crystal system of the rare-earth oxide to one which exhibits good discharge efficiency.

A third object of the present invention is to provide a light-emitting device which operates at a low discharge voltage, which can continuously emit light for a long time and which can emit high-luminance light.

To achieve the third object, a light-emitting device according to the invention comprises: a fluorescent tube including a tube having an inner surface and a fluorescent layer coated on the inner surface of the tube, for emitting light falling within a predetermined wavelength range, the tube allowing passage of light emitted from the fluorescent layer; a pair of electron-emitting electrodes provided in the fluorescent tube, opposing each other, each comprising a base plate made of electrically conductive material or semiconductor material and an electron-emitting film provided on the base plate and containing $R_2O_{3-z}$ (where R is an atom or an atom group of rare earth elements, and O is oxygen, and z is 0.0 to 1.0) for performing field emission of electrons; and a rare gas and mercury vapor which are filled in the fluorescent tube.

To accomplish the third object, too, another light-emitting device according to the invention comprises: a first substrate; a second substrate located parallel to and spaced apart from the first substrate; a cathode provided on a surface of the first substrate which opposes the second substrate, and having an electron-emitting film containing $R_2O_{3-z}$ (where R is an atom or an atom group of rare earth elements, and O is oxygen, and z is 0.0 to 1.0); an anode provided on a surface of the second substrate which opposes the first substrate, for generating a plasma when a predetermined voltage is applied between the cathode and the anode; and a rare gas filled in a space defined by the anode and the first and second substrates.

To attain the third object, too, still another light-emitting device according to the invention comprises: a first substrate; a second substrate located parallel to and spaced apart from the first substrate; a plurality of cold cathodes provided on a surface of the first substrate which opposes the second substrate, each having an electron-emitting film containing $R_2O_{3-z}$ (where R is an atom or an atom group of rare earth elements, and O is oxygen, and z is 0.0 to 1.0); at least one anode provided on a surface of the second substrate which opposes the first substrate; and a fluorescent layer provided on at least one of the first and second substrates, for emitting visible light falling within a predetermined wavelength range, upon receiving electrons from the cold cathodes.

These light-emitting devices can operate at a low discharge voltage and, thus, consume but a little power. Since the cathode or cathodes are made of material having a low sputtering property, the devices can continuously emit light for a long time and can emit high-luminance light.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

Embodiments of the present invention will be described in detail, with reference to the accompanying drawings.

Figure 1:
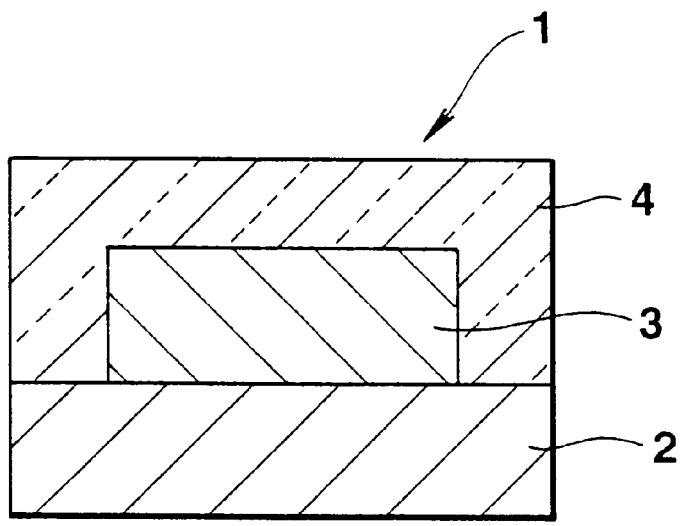
FIG. 1 is a sectional view showing an electron-emitting electrode according to an embodiment of the present invention.

FIG. 1 shows an electron-emitting electrode 1 according to the invention, which performs field emission of electrons. As shown in FIG. 1, the electrode 1 comprises a base plate 2, a rare-earth film 3 provided on the base plate 2, and an electron-emitting film 4 covering the rare-earth film 3 and the exposed part of the upper surface of the base plate 2. The base plate 2 (INCONEL 601, tradename) contains Ni and Cr.

The base plate 2 is either electrically conductive or semiconductive. It is composed of a single member made of a material having a small work function or two or more members made of different materials. To have low sputtering property, the base plate 2 must be made of a material or materials which exhibit a liquid-solid transition point under a low pressure of about $10^{-6}$ Torr. The plate 2 may be made of metals other than Ni and Cr, such as molybdenum (Mo), aluminum (Al) and the like.

The rare-earth film 3 is made of substantially a rare earth element. The electron-emitting film 4 is made of oxide $R_2O_{3-z}$, where R is an atom or an atom group of rare earth elements, and O is oxygen, and z is 0.0 to 1.0.

Figure 2:
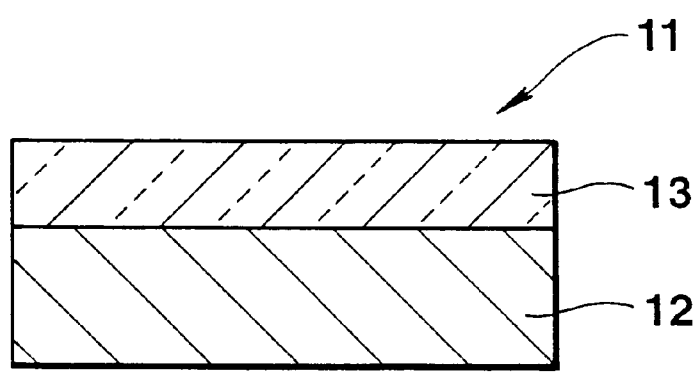
FIG. 2 is a sectional view showing an electron-emitting electrode according to another embodiment of the invention.

FIG. 2 shows an electron-emitting electrode 11 according to the invention, which differs in structure from the electron-emitting electrode illustrated in FIG. 1. The electrode 11 comprises a base plate 12 and an electron-emitting film 13 provided on the base plate 12. The base plate 12 contains nickel (Ni), for example. The electron-emitting film 13 is made of, for example, yttrium oxide.

Figure 3:
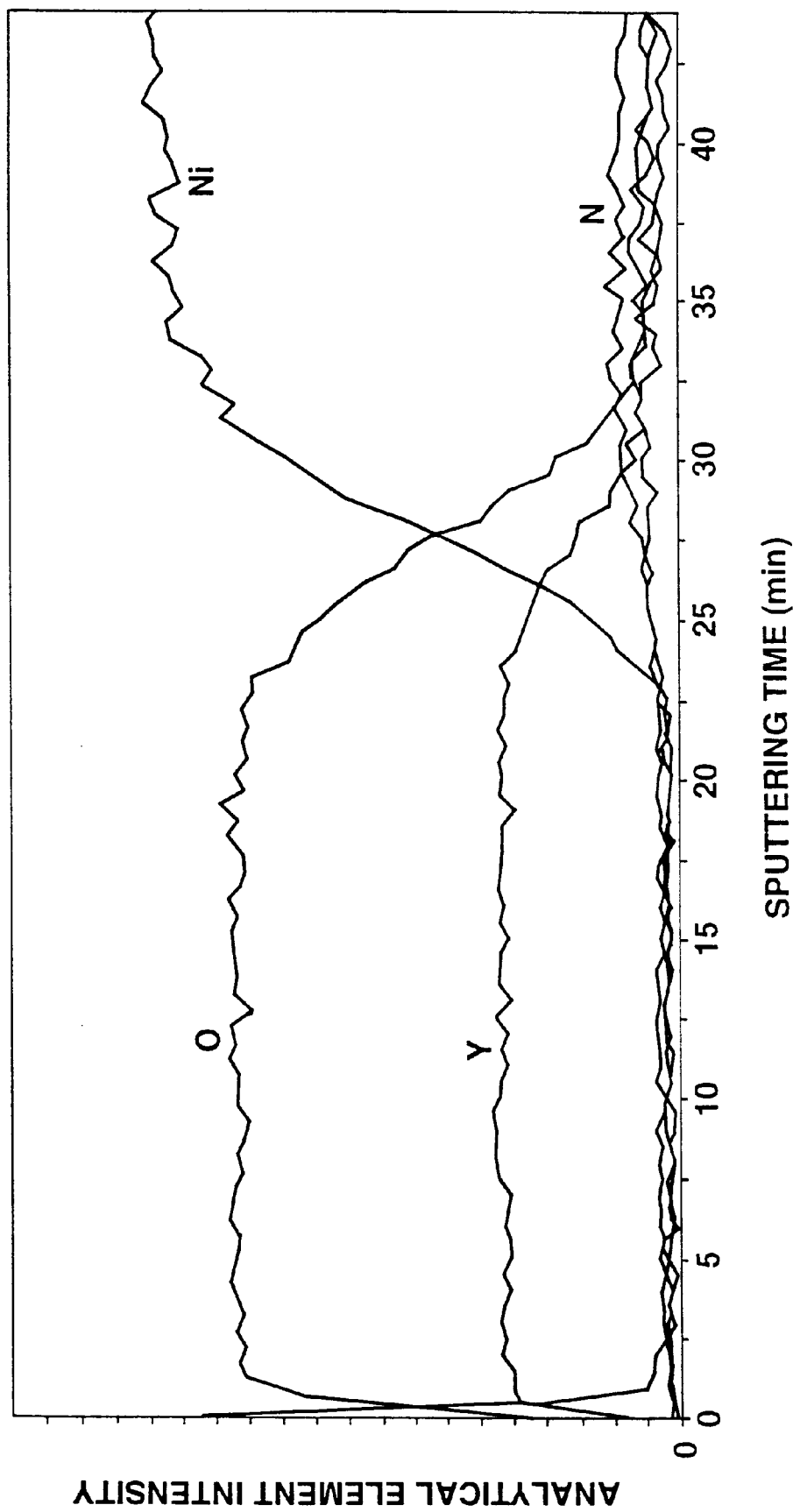
FIG. 3 is a graph representing the intensities of elements of the electrode, which were detected with respect to the direction of depth of the electrode.

FIG. 3 represents the relation between the sputtering time and the intensities of elements of the electrode 11 as shown in FIG. 2, which were detected by Auger electron spectroscopy with respect to the direction of depth of the electrode, while sputtering the elements from the surface of the film 13. The sputtering time and the intensity of each element are plotted on the abscissa and the ordinate, respectively, in FIG. 3. It is clear from FIG. 3 that the base plate 12 contains Ni and that the electron-emitting film 13 provided on the base plate 12 is made of yttrium oxide.

The electron-emitting film 13 illustrated in FIG. 1 and FIG. 2 which is made of yttrium oxide has a crystal system which is simple cubic lattice, face-centered cubic lattice, body-centered cubic lattice, intermediate between the simple cubic lattice and the face-centered cubic lattice, or intermediate between the simple cubic lattice and the body-centered cubic lattice.

Figure 4:
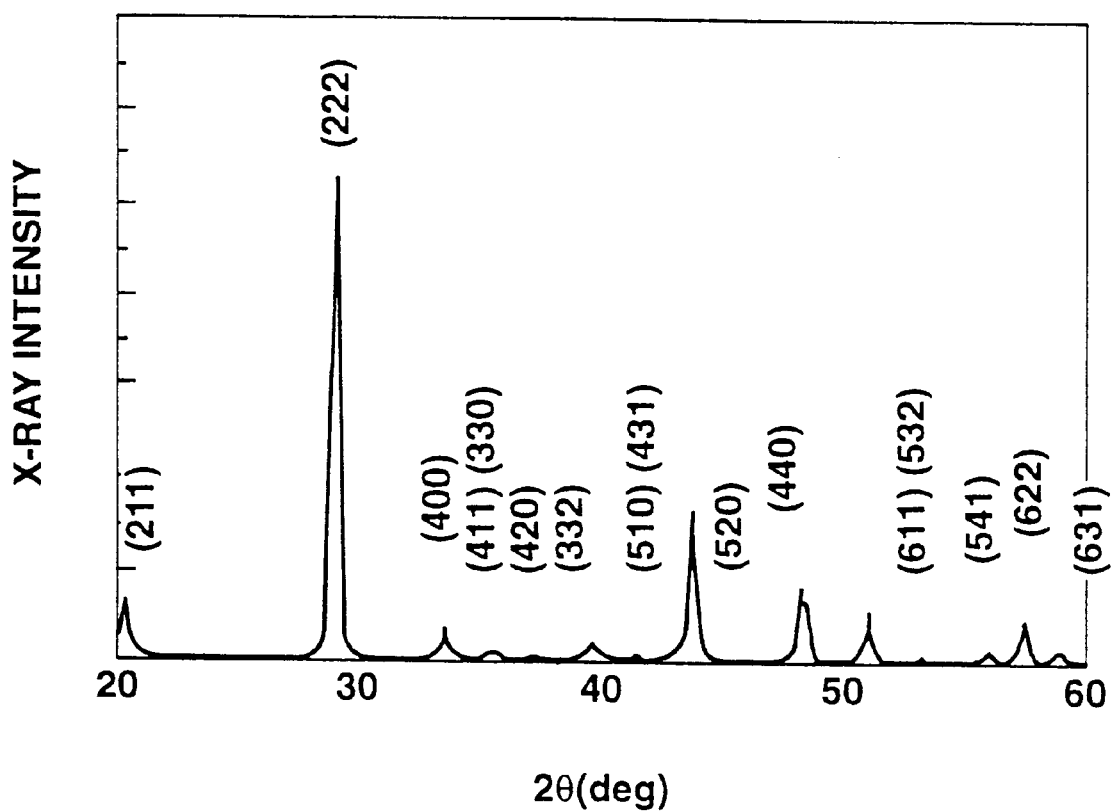
FIG. 4 is an x-ray diffraction analytical diagram of an electron-emitting electrode according to the invention, whose crystal system is a body-centered cubic lattice and has been oxidized in the atmosphere.
Figure 5:
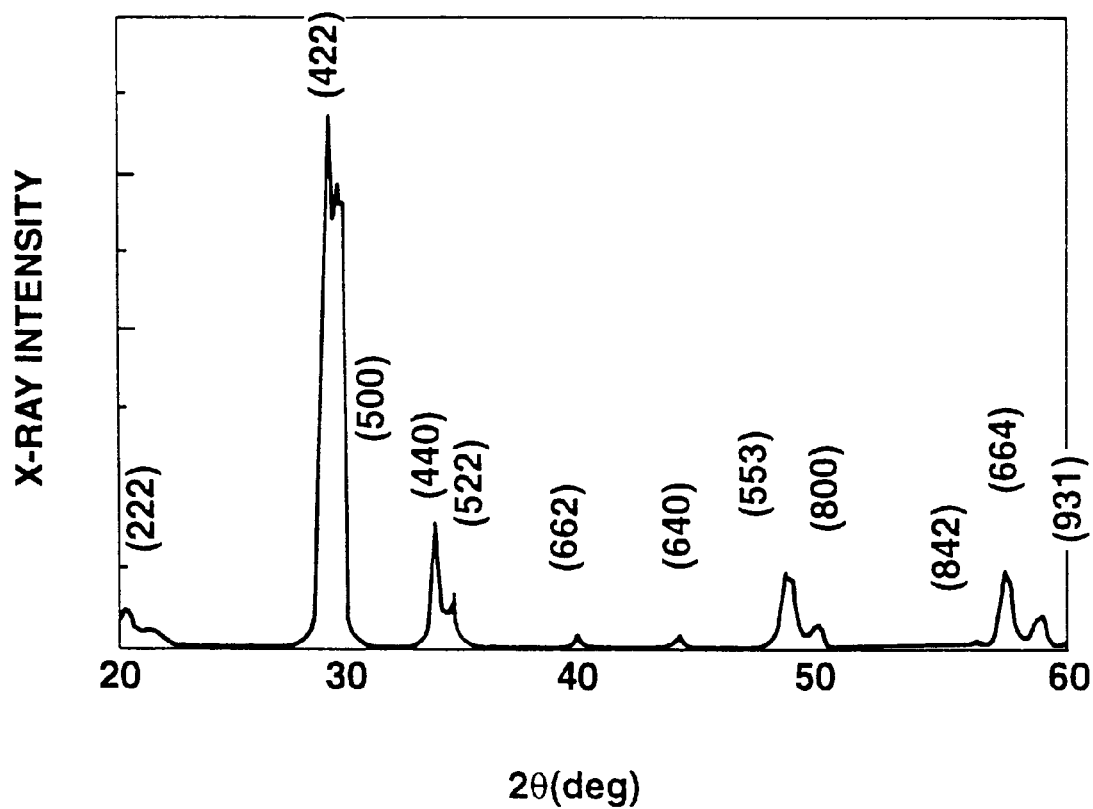
FIG. 5 is an x-ray diffraction analytical diagram of an electron-emitting electrode according to the invention, whose crystal system is a body-centered cubic lattice and has been oxidized in a hydrogen atmosphere.

FIG. 4 is an x-ray diffraction analytical diagram pertaining to the crystal lattice of yttrium oxide made by oxidizing yttrium in the atmosphere. The yttrium oxide has a lattice constant of 10.60 Å. Its crystal system is identified with body-centered cubic lattice, which will hereinafter be called "A-type lattice," for convenience sake. FIG. 5 is an x-ray diffraction analytical diagram pertaining to the crystal lattice of yttrium oxide made by oxidizing yttrium in a hydrogen atmosphere. This yttrium oxide has a lattice constant of 14.85 Å. The crystal system of this oxide is identified with simple cubic lattice, which will hereinafter be called "B-type lattice," for convenience sake. The present invention may use material whose crystal system is intermediate between body-centered cubic lattice and simple cubic lattice. The intermediate crystal system will hereinafter referred to as "AB-type lattice."

An electron-emitting electrode having an electron-emitting film made of yttrium oxide of A-type lattice, and an electron-emitting electrode having an electron-emitting film made of yttrium oxide of B-type lattice, and an electron-emitting electrode having an electron-emitting film made of yttrium oxide of AB-type lattice were tested for resistance across their thickness. They exhibited low resistance such as tens of ohms, proving that they were electrically conductive. In other words, the films had electron-emitting property.

An yttrium film about 3000 Å thick was formed on a quartz substrate by electron-beam vapor deposition and heated at about 600° C. for 15 minutes in an hydrogen atmosphere of a predetermined concentration, thereby providing a first yttrium oxide film. Further, an yttrium film about 3000 Å thick was formed on a quartz substrate by electron-beam vapor deposition and heated at about 700° C. for 30 minutes in the atmosphere, thereby providing a second yttrium oxide film. The first and second yttrium films were examined for their optical characteristics.

Figure 6:
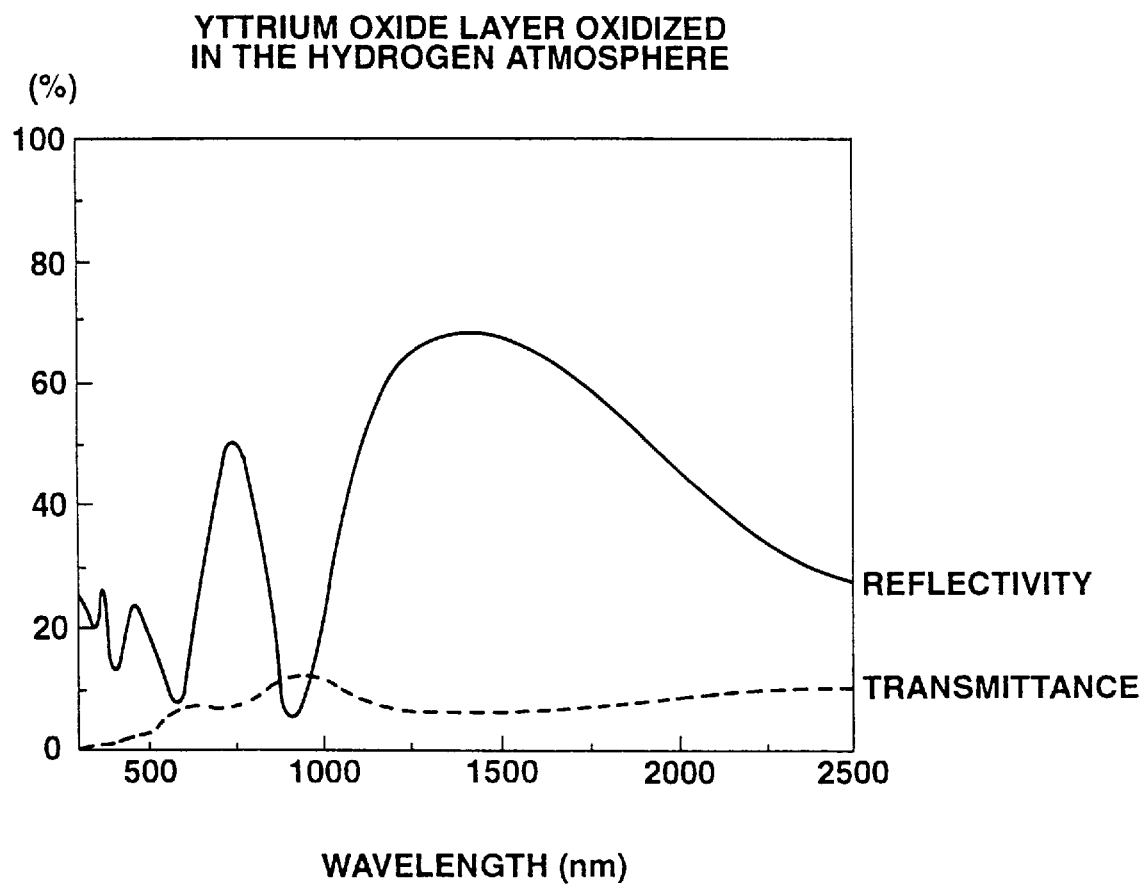
FIG. 6 is a diagram showing the optical characteristics of an electron-emitting electrode of this invention, which has been oxidized in a hydrogen atmosphere.

The first yttrium oxide film had B-type lattice and exhibited the transmittance characteristic of FIG. 6. In FIG. 6, transmittance and reflectivity are plotted on the ordinate, and the wavelength of the light applied to the electron-emitting electrode comprising the quartz substrate and the first yttrium oxide film. The transmittance is the ratio of the amount of light which passed through both the quartz substrate and the yttrium oxide film to the amount (100%) of the light applied to the electron-emitting electrode. The reflectivity is the ratio of the amount of light reflected by the quartz substrate and the yttrium oxide film to the amount of light reflected by an aluminum (Al) plate having smooth surfaces.

Figure 7:
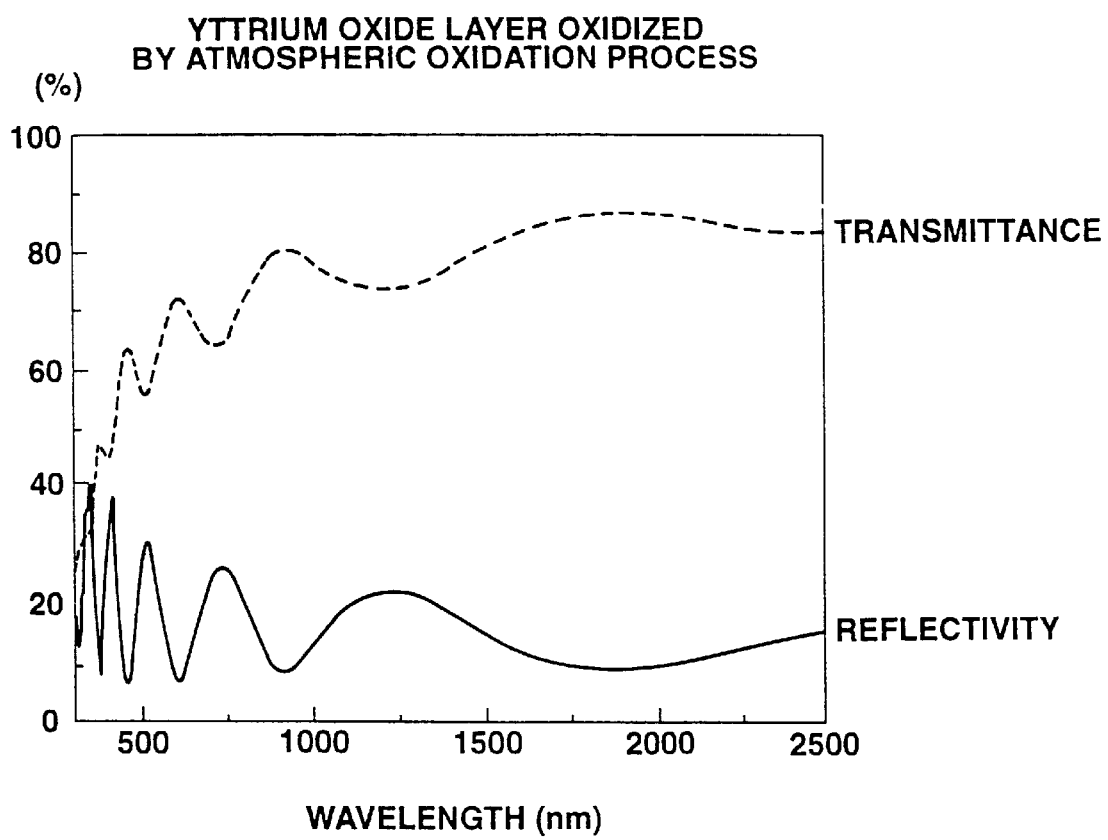
FIG. 7 is a diagram showing the optical characteristics of an electron-emitting electrode of the invention, which has been oxidized in the atmosphere.

The second yttrium oxide film had A-type lattice and exhibited the transmittance characteristic of FIG. 7. As seen from FIG. 7, the electron-emitting electrode having the second yttrium oxide (A-type lattice) film exhibited a transmittance over 50% to light whose wavelength ranges from 500 nm to 2500 nm. On the other hand, the electron-emitting electrode having the second yttrium oxide (B-type lattice) film exhibited a transmittance below 20% to light having a wavelength ranging from 500 nm to 2500 nm.

Hereinafter, the first yttrium oxide film whose crystal system is A-type will be called "A-type yttrium oxide film," and the second yttrium oxide film whose crystal system is B-type will be called "B-type yttrium oxide film."

As is shown in FIG. 7, the electron-emitting electrode having the A-type yttrium oxide film exhibited a reflectivity below 40% to light whose wavelength ranges from 500 nm to 2500 nm. By contrast, the electron-emitting electrode having the B-type yttrium oxide film exhibited a reflectivity ranging from a few percent to 75% to light having a wavelength ranging from 500 nm to 2500 nm. Namely, the maximum reflectivity surpasses 60%.

As is obvious from FIGS. 6 and 7, yttrium oxides different in crystal system greatly differ in terms of optical characteristics.

One of the optical characteristics of a substance is absorption edge. The A-type and B-type yttrium oxide films were examined for their absorption edges. In general definition, an absorption edge is a point or part in a continuous absorption spectrum, at which the absorption sharply decreases for the light beams of longer wavelengths. Herein, however, it is defined as a point at which the transmittance falls to too small a value to be measured accurately.

Figure 8:
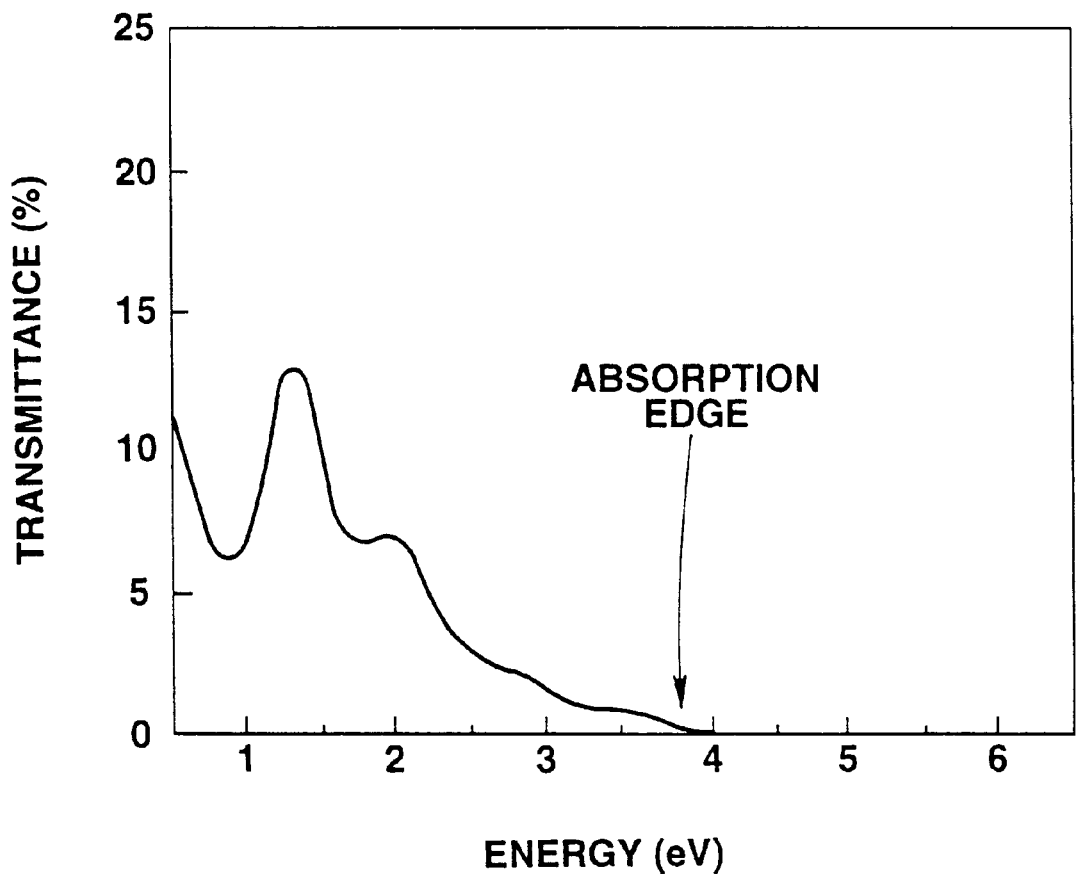
FIG. 8 is a diagram illustrating the absorption edge of the electron-emitting electrode which has been oxidized in the hydrogen atmosphere.
Figure 9:
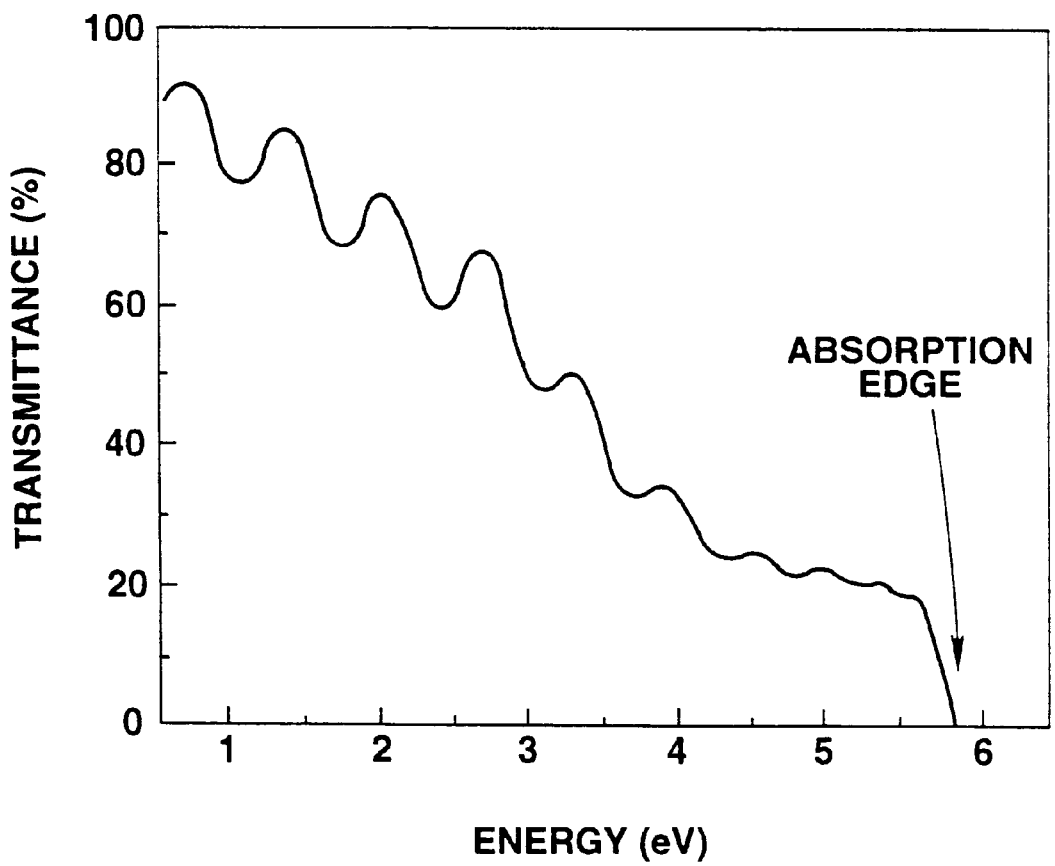
FIG. 9 is a diagram illustrating the absorption edge of the electron-emitting electrode which has been oxidized in the atmosphere.

FIG. 8 illustrates the absorption edge of the B-type yttrium oxide film prepared by oxidizing an yttrium film in the hydrogen atmosphere having the predetermined concentration. FIG. 9 shows the absorption edge of the A-type yttrium oxide film prepared by oxidizing an yttrium film in the atmosphere. The B-type yttrium oxide film has its absorption edge at a little less than 4.0 eV, while the A-type yttrium oxide has its absorption edge at about 5.9 eV. Obviously, the B-type yttrium oxide is on a low-energy side as compared with the A-type yttrium oxide. Thus, it will be apparent that the various optical characteristics of yttrium oxide depend upon the crystal system of the oxide.

Moreover, cold-cathode discharge lamps were made to be tested to determine their discharge characteristics. Each of these lamps comprises a cylindrical glass tube and a pair of electron-emitting electrodes. Each electrode had an yttrium oxide film which can perform cold emission of electrons. The tube had an outer diameter of 2.6 mm and a length of 63.5 mm and was filled with a rare gas and mercury vapor. The electron-emitting electrodes were located within the tube, opposing each other and spaced apart by a distance of 45 mm.

These cold-cathode discharge lamps consisted of three groups. The lamps of first group had electrodes each having an electron-emitting film made of A-type yttrium oxide. Those of the second group had electrodes each having an electron-emitting film made of B-type yttrium oxide. Those of the third group had electrodes each having an electron-emitting film made of nickel (Ni), which were outside the scope of the present invention. The cold-cathode discharge lamps of all groups were tested for their discharge voltages. The lamps of the first group, having films made of A-type yttrium oxide, operated at a voltage about 30 V lower than the operating voltage of the lamps of the third group which had electron-emitting films made of nickel. The lamps of the second group, having films made of B-type yttrium oxide, operated at a voltage about 50 V lower than the operating voltage of the lamps of the third group.

Figure 10:
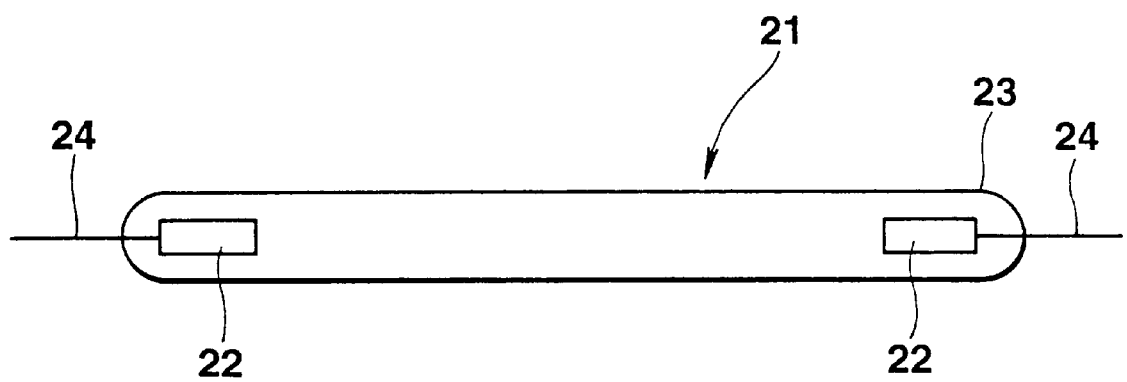
FIG. 10 is a schematic sectional view of a cold-cathode fluorescent lamp according to this invention.

Furthermore, cold-cathode fluorescent lamps 21 of the type shown in FIG. 10 were made. As seen from FIG. 10, the lamps 21 were identical in structure to the cold-cathode discharge lamps described above, except that a fluorescent layer coated on its inner surface of the glass tube 23. The glass tube 23 was filled with a rare gas and mercury vapor. A pair of electron-emitting electrodes 22 were located within the tube 23, opposing each other and connected to two wires 24, respectively.

Figure 11:
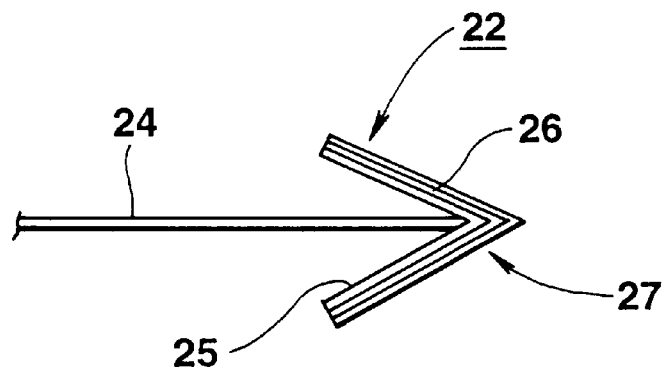
FIG. 11 is a schematic plan view of an electron-emitting electrode incorporated in the cold-cathode fluorescent lamp.

As is shown in FIG. 11, the electron-emitting electrode 22 is bent at the middle part, in the form of letter V. Each electrode 22 is composed of an Ni—Cr alloy (INCONEL 601) base plate 25, an yttrium (Y) film 26 provided on the base plate 25, and an electron-emitting film 27 made of B-type yttrium oxide and provided on the yttrium film 26. The electrodes 22 are positioned such that their electron-emitting films 27 oppose each other. Having the film 27 made of B-type yttrium oxide, the lamps 21 can operate at a lower discharge voltage than cold-cathode fluorescent lamps which have electron-emitting films of A-type yttrium oxide.

The cold-cathode fluorescent lamps 21 were tested for their light-emitting characteristics. In each lamp 21, the electrodes 22 emitted electrons. The electrons impinged upon the mercury atoms, generating ultraviolet rays. The ultraviolet rays excited the fluorescent layer coated on the inner surface of the tube 23. Thus excited, the fluorescent layer emitted visible light within a predetermined wavelength range. The results of the test were as shown in the following Table 1, along with the emission characteristics of the conventional cold-cathode fluorescent lamps which comprise electron-emitting electrodes each having an Ni electron-emitting film.

TABLE 1

| electrodes | lamp current IL (mA) | lamp voltage VL (V) | luminance (cd/m2) | luminance flux (lm) | luminance efficiency (lm(V · A)) |
|---|---|---|---|---|---|
| B-type | 5.0 | 156 | 27100 | 25.4 | 32.6 |
| Ni-type | 5.0 | 204 | 24400 | 24.1 | 23.6 |

As can be understood from Table 1, the lamps 21 provided with electrodes each having a B-type yttrium oxide film (hereinafter referred to as "B-type electrodes") were superior to the conventional lamps having Ni-type electrodes in terms of luminance and luminous efficiency, despite the lamp voltage was about 23.5% less than that of the conventional lamps. In addition, after the lamps 21 had been operated for a long time, they exhibited sputtering property much lower than the conventional lamps having Ni-type electrodes, like cold-cathode fluorescent lamps which have electrodes each having an A-type yttrium oxide film (hereinafter referred to as "A-type electrodes").

Figure 12:
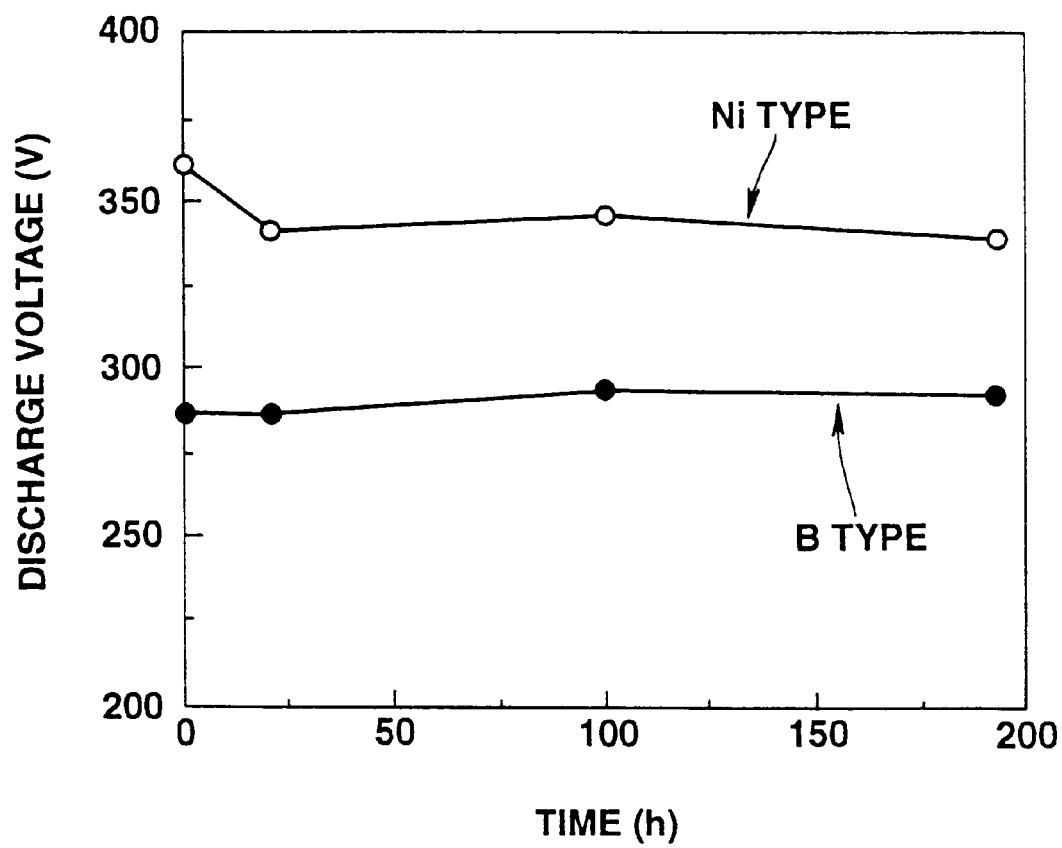
FIG. 12 is a diagram illustrating the discharge characteristic of the electron-emitting electrode according to the invention and that of a conventional Ni-type electrode.

Still further, cold-cathode discharge lamps were made, each comprising a cylindrical glass tube having an inner diameter 12 mm, a pair of disc-shaped, electron-emitting B-type electrodes having diameters of 10 mm and located within the tube and spaced apart by 220 mm. These lamps were tested to determine how their discharge characteristics change with time. The results of the test were as is shown in FIG. 12. As is evident from FIG. 12, the cold-cathode discharge lamps having B-type electrodes achieved stable initial discharge. They had no marked voltage drop until they were continuously operated for 200 hours. They were found to have a discharge voltage which is about 15 to 20% less than the discharge voltage of the conventional cold-cathode discharge lamps which have Ni-type electrodes. Further, they exhibited sputtering property lower than the conventional lamps having Ni-type electrodes. Cold-cathode discharge lamps, each comprising a tube having an inner diameter of 15 mm and electron-emitting B-type electrodes, proved to have a discharge lifetime exceeding 3000 hours.

The electron-emitting film has a resistance of 10000Ω at most to the extent of 45000 Å thick.

Yttrium oxide films whose crystal system is face-centered cubic lattice, and yttrium oxide films whose crystal system is intermediate between simple cubic lattice and face-centered cubit lattice have been found to operate at a low discharge voltage. AB-type yttrium oxide films, whose crystal system is intermediate between body-centered cubit lattice and simple cubic lattice, has been found to operate at a low discharge voltage, too.

In the present invention, yttrium can be replaced by any other rare earth element. More specifically, scandium (Sc), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) or lutetium (Lu) can be used instead of yttrium (Y).

The electron-emitting electrodes according to the invention, which have the structure described above, have good electron-emitting property at a low discharge voltage. Additionally, they exhibit low sputtering property and can therefore continuously emit electrons for a long period of time.

Hence, the electron-emitting electrodes of this invention can used in cold-cathode fluorescent lamps employed as the white-emitting back lights in non-self-emission displays (e.g., liquid crystal displays). Also can they be used as cathodes in monochromatic or color display displays, in a plasma displays and in FEDs (Field Emissive Displays) used as VFDs (Vacuum Fluorescent Displays).

A first method of manufacturing the electron-emitting electrodes of the type shown in FIG. 1, which perform field emission of electrons, will be explained below.

The first method comprises the steps of: washing a base plate; forming a metal film on the base removing the hydrogen from the yttrium oxide film 36.

Cold-cathode fluorescent lamps manufactured by washing a base plate, forming an yttrium film and oxidizing the surface region of the film, but not dehydrogenating the resultant yttrium oxide film emitted but bluish white light after one hundred hours of continuous discharge. This is due to the hydrogen contained in the yttrium oxide film. This is why the yttrium oxide film formed in an hydrogen atmosphere should be dehydrogenated.

In the manufacture of a cold-cathode fluorescent lamp, impurities such as water are usually removed from the glass tube before electrodes each having an yttrium oxide film are sealed within the tube. The removal of impurities is accomplish ed by heating the glass tube at about 400° C. in a pressure-reduced atmosphere. The heating process can indeed serve to remove some amount of hydrogen from the yttrium oxide films. Since the temperature is relatively low (about 400° C.), however, the fluorescent lamp cannot achieve initial discharge so readily as one comprising electrodes each having a dehydrogenated yttrium oxide film. Hence, the yttrium oxide film 36 should be dehydrogenated in a pressure-reduced atmosphere at 450° C. or more.

Figure 15:
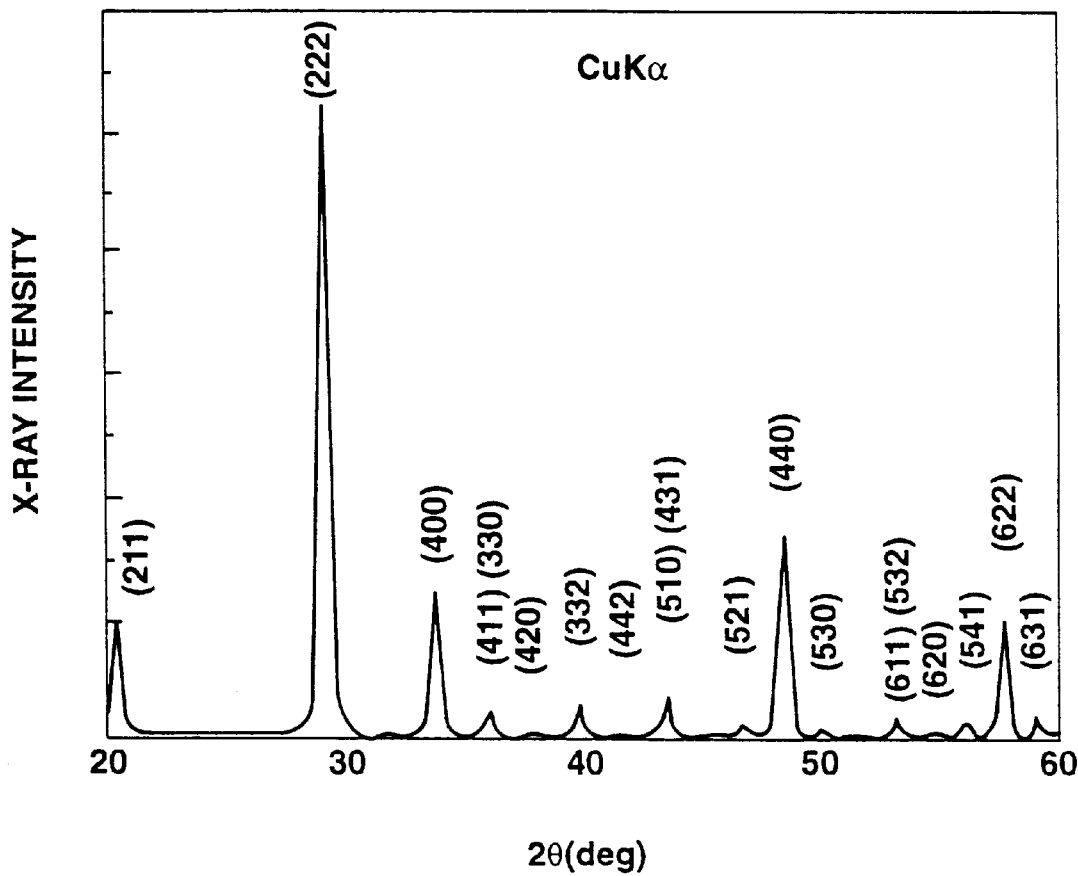
FIG. 15 is an x-ray diffraction analytic diagram of an electron-emitting electrode according to the invention, whose crystal system is a body-centered cubic lattice.
Figure 16:
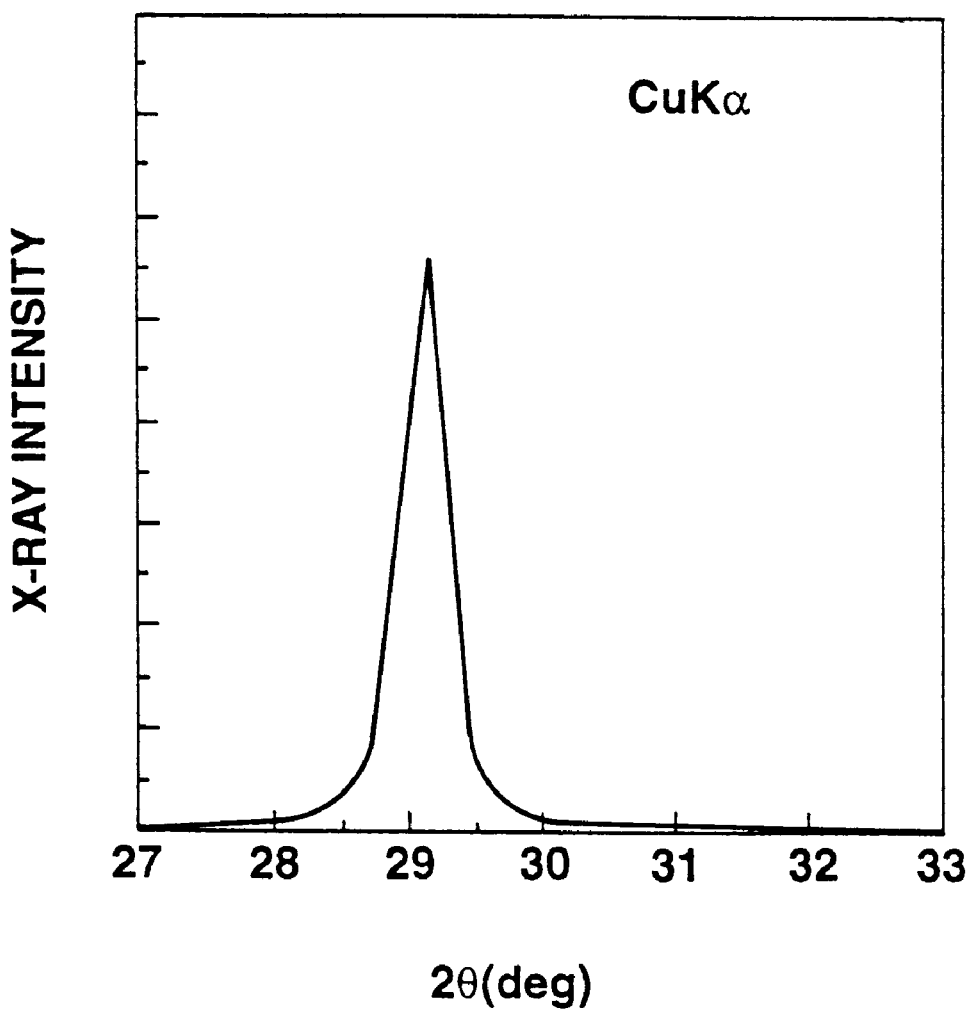
FIG. 16 is an enlarged part of the x-ray diffraction analytic diagram shown in FIG. 15.

When an yttrium film about 3000 Å thick is heated and oxidized in a hydrogen atmosphere in which the concentration of oxygen and/or oxygen-containing substance exceeds the order of 100 ppm, there is formed an yttrium oxide film about 4500 Å thick, identified with A-type lattice (body-centered cubic lattice). This yttrium oxide film exhibits the x-ray diffraction analytic pattern illustrated in FIG. 15. The oxide film has a lattice constant of 10.60 Å and has one x-ray intensity peak which appears at about 29° as shown in FIG. 16.

Figure 17:
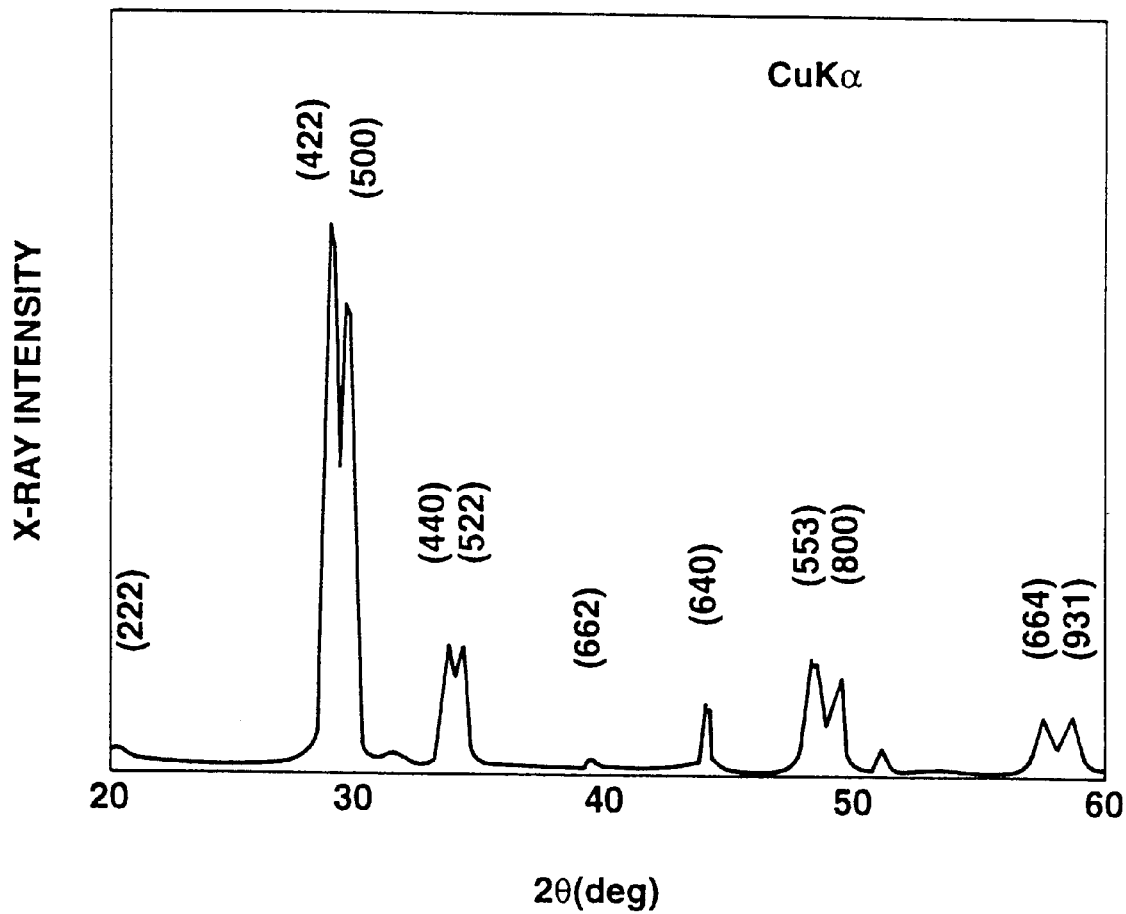
FIG. 17 is an x-ray diffraction analytic diagram of an electron-emitting electrode according to the invention, whose crystal system is a simple cubic lattice.
Figure 18:
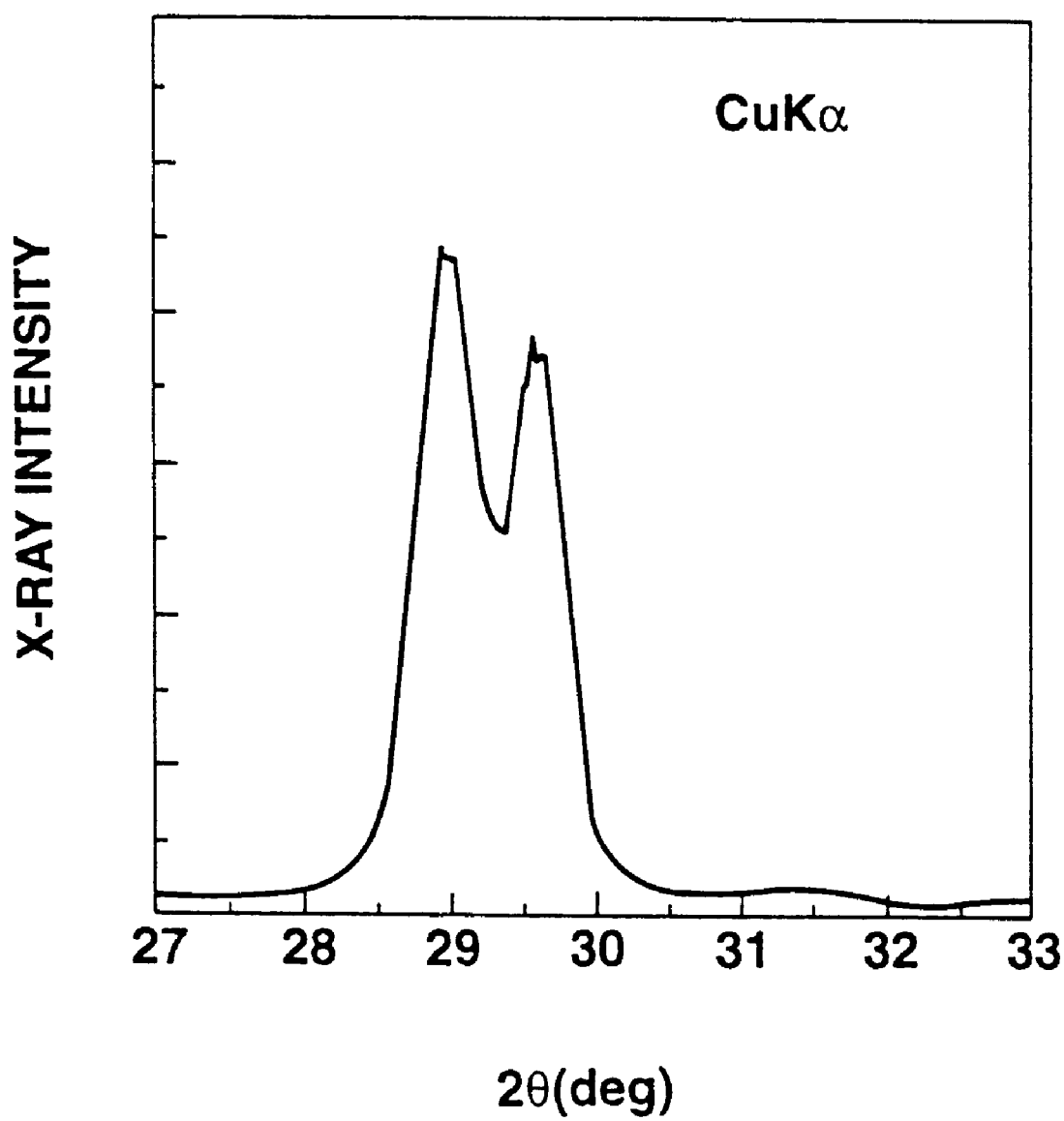
FIG. 18 is an enlarged part of the x-ray diffraction analytic diagram shown in FIG. 17.

When an yttrium film about 3000 Å thick is heated and oxidized in a hydrogen atmosphere in which the concentration of oxygen and/or oxygen-containing substance is in the 10-ppm order, there is formed an yttrium oxide film about 4500 Å thick, identified with B-type lattice (simple cubic lattice). This yttrium oxide film exhibits the x-ray diffraction analytic pattern shown in FIG. 17. It has a lattice constant of 14.85 Å and has a high x-ray intensity peak at about 29° and a low x-ray intensity peak at about 29.6°, as is illustrated in FIG. 18.

Figure 19:
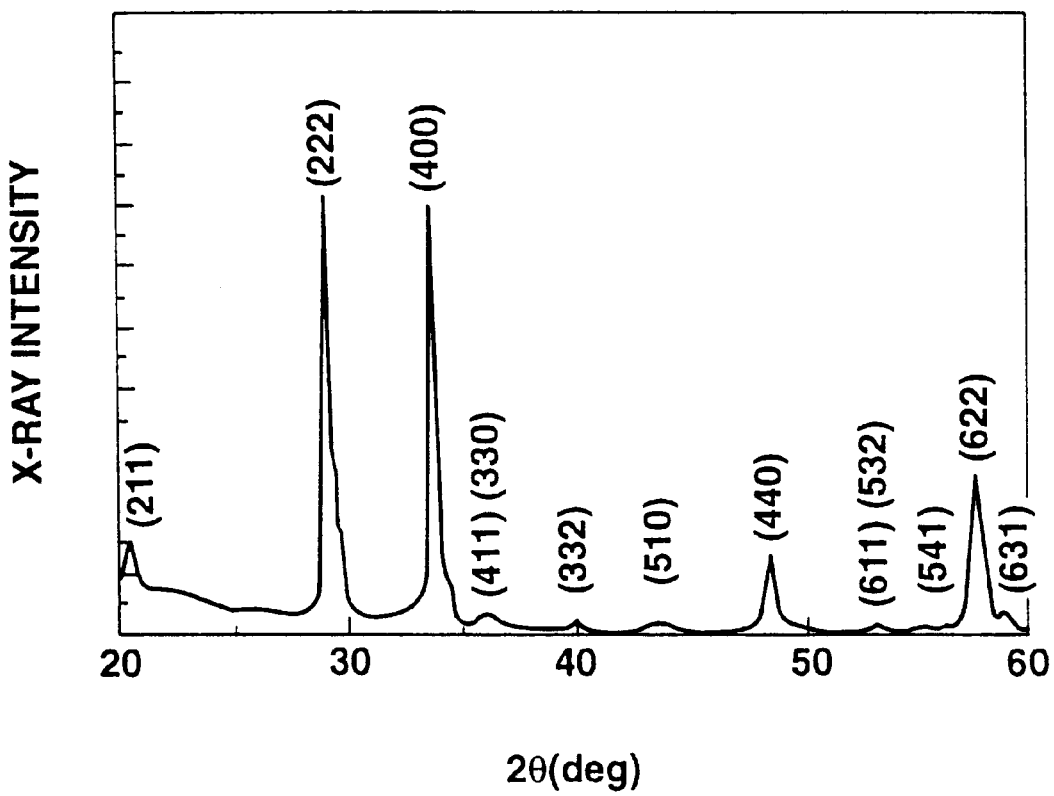
FIG. 19 is an x-ray diffraction analytic diagram of an electron-emitting electrode according to the invention, in which a crystal system intermediates between body-centered cubic lattice and simple cubic lattice.
Figure 20:
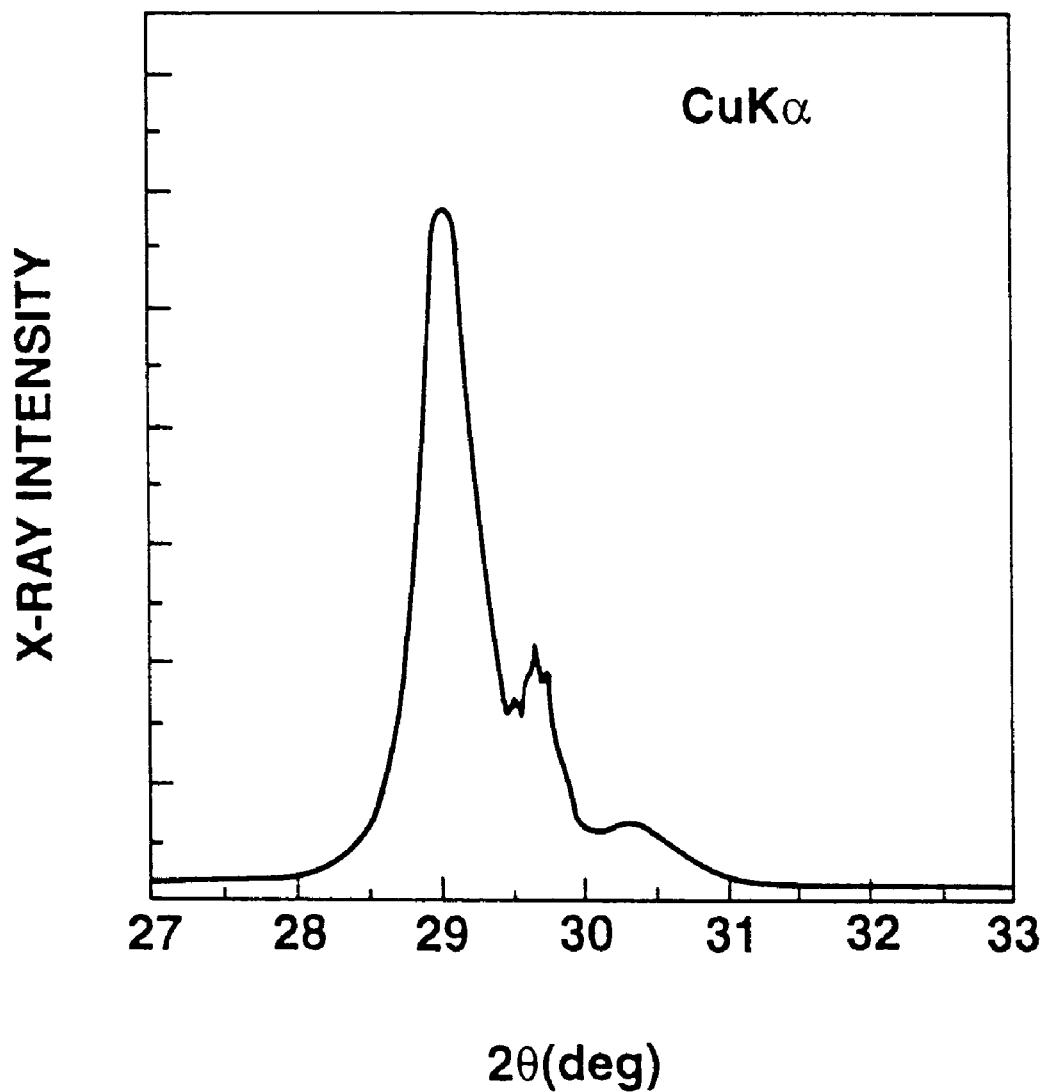
FIG. 20 is an enlarged part of the x-ray diffraction analytic diagram shown in FIG. 19.

When an yttrium film about 3000 Å thick is heated and oxidized in a hydrogen atmosphere in which the concentration of oxygen and/or oxygen-containing substance is in the order of 100 ppm, there is formed an yttrium oxide film about 4500 Å thick, identified with AB-type lattice, i.e., a crystal system intermediate between A-type lattice and B-type lattice. (The concentration in the 100-ppm order is higher than the concentration suitable for forming the B-type yttrium oxide film and lower than the concentration suitable for forming the A-type yttrium oxide film.) The yttrium oxide film thus formed exhibits the x-ray diffraction analytic pattern shown in FIG. 19. It has a high x-ray intensity peak at about 29 and a low x-ray intensity peak at about 29.6°, as is illustrated in FIG. 20.

Figure 21:
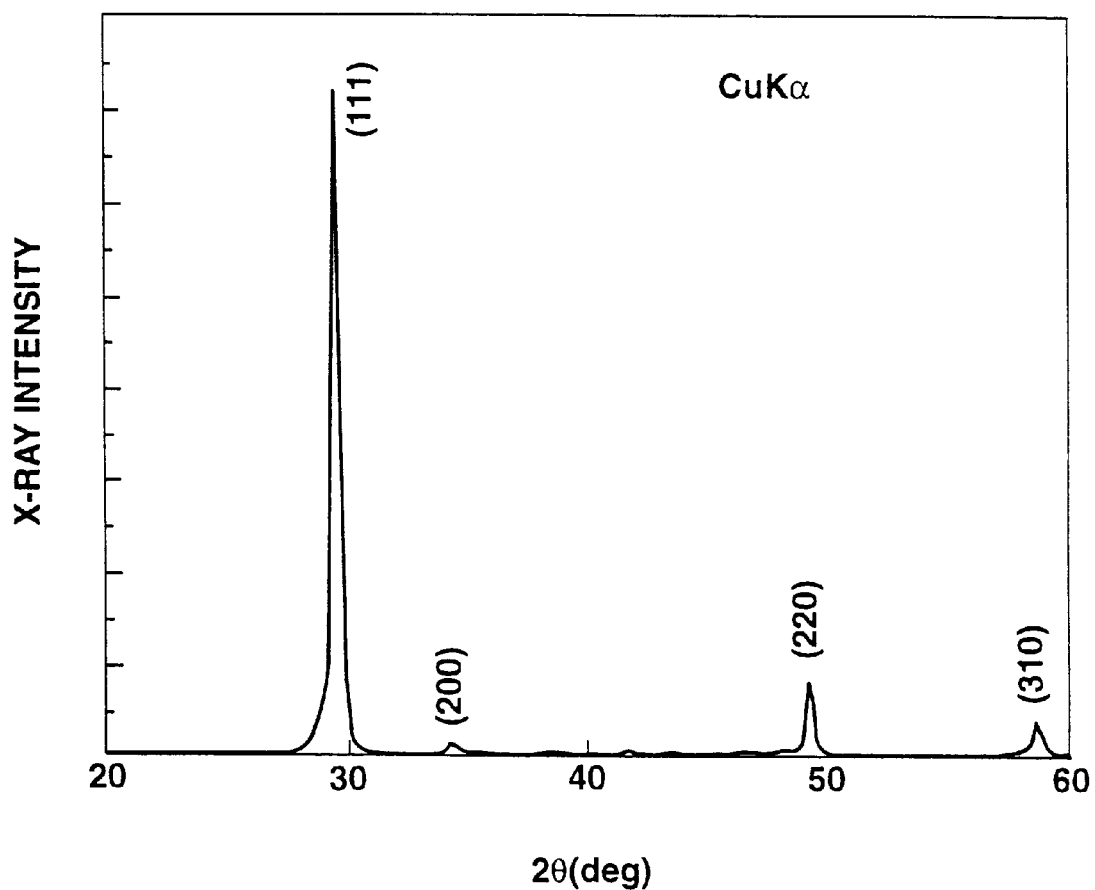
FIG. 21 is an x-ray diffraction analytic diagram of an electron-emitting electrode according to the invention, whose crystal system is a face-centered cubic lattice.
Figure 22:
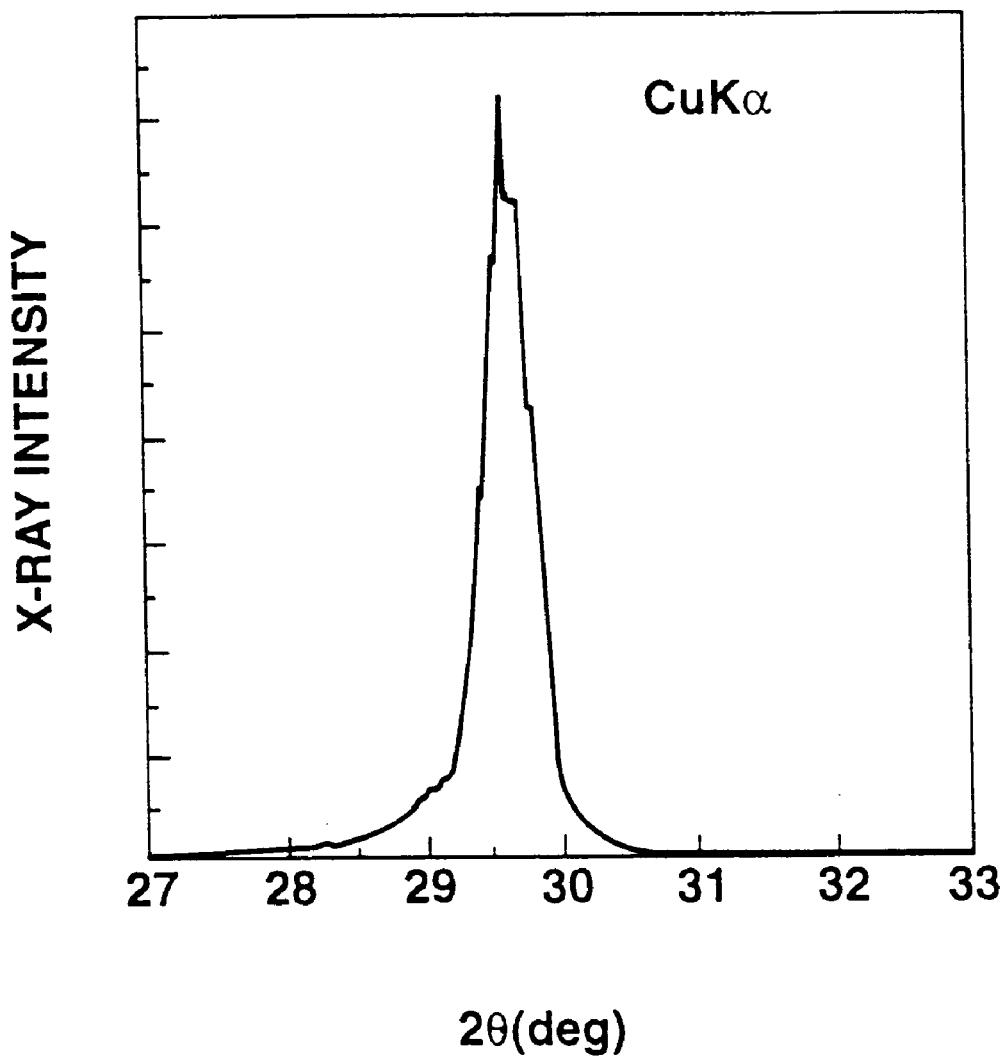
FIG. 22 is an enlarged part of the x-ray diffraction analytic diagram shown in FIG. 21.

When an yttrium film about 3000 Å thick is heated and oxidized in a hydrogen atmosphere in which the concentration of oxygen and/or oxygen-containing substance is in the 1-ppm order, there is formed an yttrium oxide film about 4500 Å thick, identified with face-centered cubic lattice (hereinafter referred to as "C-type lattice"). This oxide film exhibits the x-ray diffraction analytic pattern shown in FIG. 21. It has a lattice constant of 5.21 Å and has a large x-ray intensity peak at about 29.6°, as is illustrated in FIG. 22.

Figure 23:
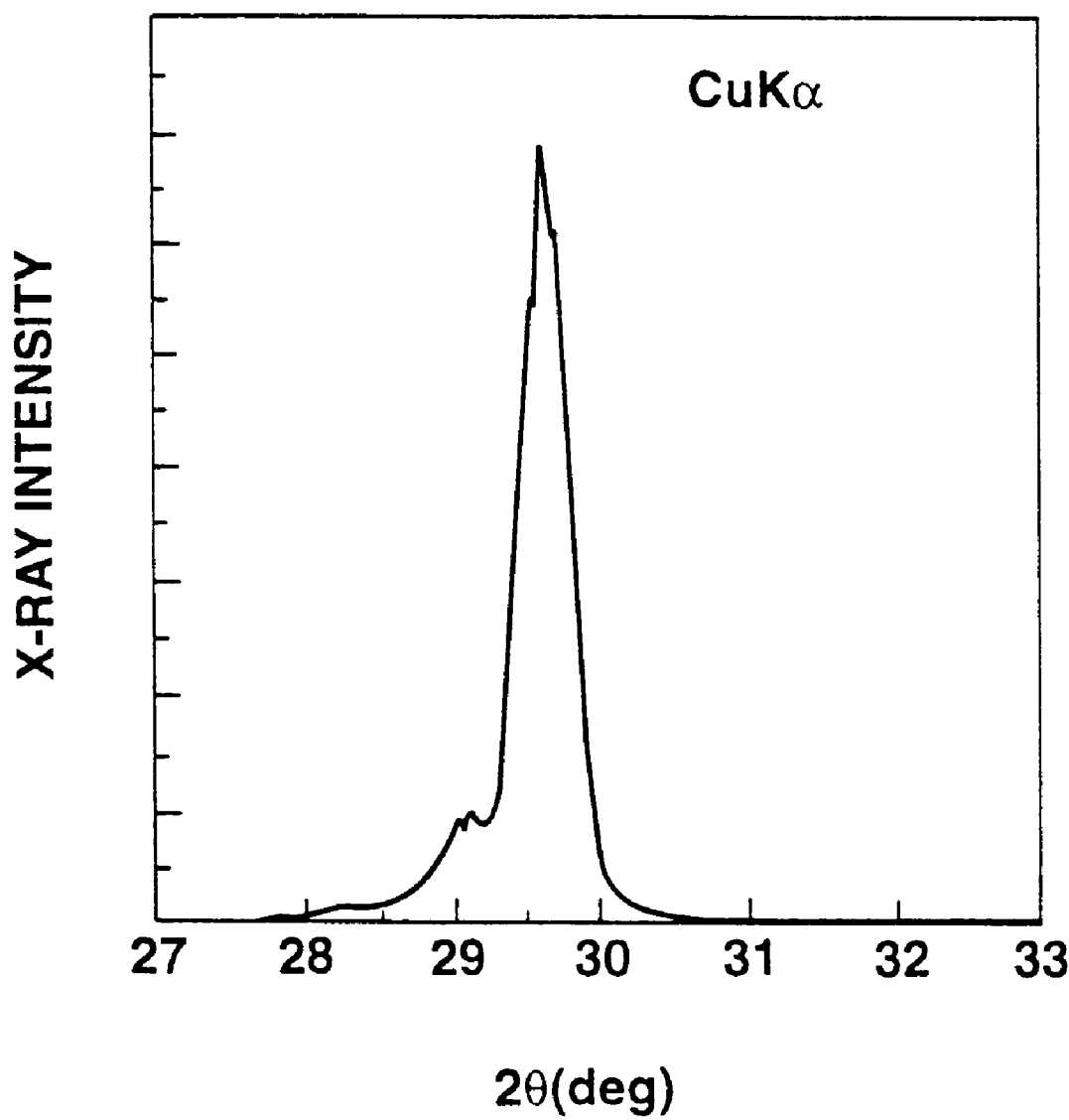
FIG. 23 is an x-ray diffraction analytic diagram of an electron-emitting electrode according to the invention, in which a crystal system intermediates between body-centered cubic lattice and simple cubic lattice.

When an yttrium film about 3000 Å thick is heated and oxidized in a hydrogen atmosphere in which the concentration of oxygen and/or oxygen-containing substance is higher than the concentration suitable for forming a C-type yttrium oxide film and lower than the concentration suitable for forming a B-type yttrium oxide film, there is formed an yttrium oxide film about 4500 Å thick, identified with a crystal system intermediate between B-type lattice and C-type lattice (hereinafter referred to as "BC-type lattice"). This yttrium oxide film exhibits the x-ray diffraction analytic pattern shown in FIG. 23. It has low x-ray intensity peaks at about 29° and a high x-ray peak at about 29.6°, as is illustrated in FIG. 23.

As can be understood from the above, the crystal system of an yttrium oxide film can be changed by adjusting the oxygen concentration in the hydrogen atmosphere.

Three types of cold-cathode fluorescent lamps, each having a pair of electron-emitting electrodes made by the first method were manufactured. The first type comprised electrodes each having a B-type yttrium oxide film about 4500 Å thick; the second type comprised electrodes each having a BC-type yttrium oxide film; and the third type comprised electrodes each having a C-type yttrium oxide film. These lamps were tested for their emission characteristics. The results were as specified in Table 2 presented below. Also shown in Table 2 is the emission characteristic of a conventional cold-cathode fluorescent lamp incorporating Ni-type electron-emitting electrodes, for comparison with the emission characteristics of the three types of lamps according to the present invention. All these fluorescent lamps, including the conventional one, had the same structure shown in FIG. 10, each comprising a glass tube 21 and a pair of electron-emitting electrodes 22 located in the tube 21. The tube 21 was filled with a rare gas and mercury vapor and had its inner surface coated with a white-emitting fluorescent material. The glass tube 21 was 63.5 mm long and has an outer diameter of 2.6 mm, and the electrodes 22 opposed each other, spaced part by a distance of 45 mm.

TABLE 2

| electrodes | lamp current IL (mA) | lamp voltage VL (V) | luminance (cd/m²) | luminous flux F (lm) | luminous efficiency (lm/(V · A)) | conductivity | improvement in lamp voltage over Ni-type (%) |
|---|---|---|---|---|---|---|---|
| B-type | 5.0 | 164 | 26000 to 29000 | 25 to 26 | 30.5 to 31.7 | ○ | +27 |
| BC-type | 5.0 | 164 | 26000 to 29000 | 25 to 26 | 30.5 to 31.7 | ○ | +27 |
| C-type | 5.0 | 164 | 26000 to 29000 | 25 to 26 | 30.5 to 31.7 | ○ | +27 |
| Ni-type | 5.0 | 225 | 24000 to 25000 | 23.5 to 24.5 | 20.9 to 21.8 | ○ | — |

As evident from Table 2, the cold-cathode fluorescent lamps having the B-type, BC-type and C-type electrodes are superior to the conventional lamp in terms of luminance and luminous efficiency, in spite of the relatively low discharge voltage. Although these yttrium oxide films are over several hundred Å in thickness, these electrodes exhibited high electrical conductivity. The lamps having the B-type, BC-type and C-type electrodes had much low sputtering property than the conventional lamp which had Ni-type electron-emitting electrodes. They did continuously emit light for a longer time than the conventional cold-cathode fluorescent lamp.

The values for the lamp having B-type electrodes, shown in Table 1, differ from those specified in Table 2. The same is true of the conventional lamp having Ni-type electrodes. This is because one analyzer was used to get the results of Table 1, and another analyzer was employed to obtain the results of Table 2.

The lamp having A-type electrodes and the lamp having AB-type electrodes achieved greater luminance and higher luminous efficiency than the conventional lamp having Ni-type electrodes, despite their discharge voltage was lower than that of the conventional lamp. Nevertheless, their luminance and luminous efficiency were found to be less than those of the lamp having C-type electrodes.

A second method of manufacturing the electron-emitting electrodes of the type shown in FIG. 1, which perform cold emission of electrons, will be explained with reference to FIGS. 13 and 14.

The second method comprises the steps of: washing a base plate; forming a metal film on the base plate; and oxidizing the metal film in a rare gas atmosphere for forming an electron-emitting film. The three steps are carried out in the order mentioned, thereby providing an electron-emitting electrode which has an electron-emitting film having a predetermined crystal lattice. The base plate is made of electrically conductive material or semiconductor material. The electron-emitting film contains $R_2O_{3-z}$ (where R is an atom or an atom group of rare earth elements, and O is oxygen, and z is 0.0 to 1.0) and can emit cold electrons. In this example, too, the rare earth element is yttrium (Y).

At first, the base plate 33 made of an Ni—Cr alloy (INCONEL 601) is washed. An yttrium film 34 is formed on the base plate 33 by vapor deposition (achieved by resistance heating or application of an electron beam) or sputtering, to a thickness ranging from 1000 Å to 30000 Å.

Next, the resultant structure consisting of the base plate 33 and the yttrium film 34 is placed on the plate; oxidizing the metal film in a hydrogen atmosphere for forming an electron-emitting film; and dehydrogenating the electron-emitting film. These steps are carried out in the order mentioned, thereby providing an electron-emitting electrode which has an electron-emitting film having predetermined crystal lattice. The base plate is made of electrically conductive material or semiconductor material. The electron-emitting film provided on the base plate contains $R_2O_{3-z}$ (where R is an atom or an atom group of rare earth elements, and O is oxygen, and z is 0.0 to 1.0) and can perform field emission of cold electrons. In this example, the rare earth element is yttrium (Y).

The first method will now be explained in detail, with reference to FIGS. 13 and 14.

At first, the base plate 33 made of an Ni—Cr alloy (INCONEL 601) is washed. An yttrium film 34 is formed on the base plate 33 by vapor deposition (achieved by resistance heating or application of an electron beam) or sputtering, to a thickness ranging from 1000 Å to 30000 Å.

Figure 13:
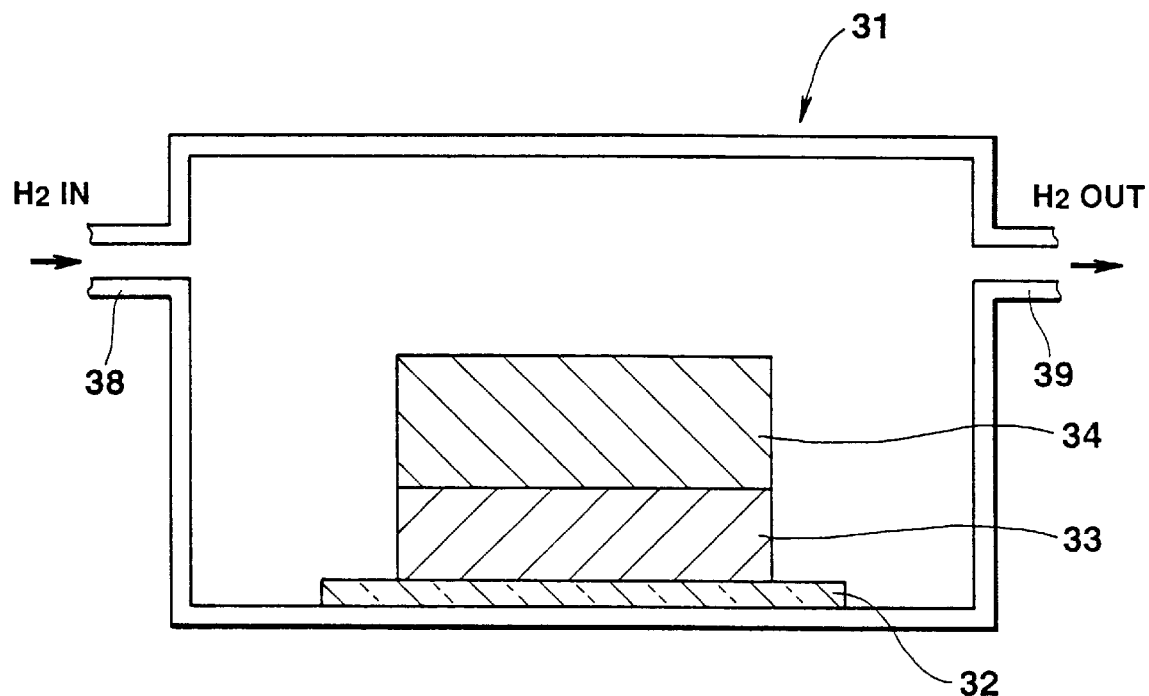
FIG. 13 is a sectional view explaining a step of the method of manufacturing an electron-emitting electrode according to the present invention.

Next, the resultant structure consisting of the base plate 33 and the yttrium film 34 is placed on a table 32 in a reaction furnace 31, as is illustrated in FIG. 13. As shown in FIG. 13, the furnace 31 has a gas inlet port 38 and a gas outlet port 39. Hydrogen is introduced into the furnace 31 through the gas inlet port 38 such that the furnace 31 is kept filled with hydrogen. It is desirable that the concentration of oxygen and/or oxygen-containing substance be 1% or less by volume, preferably 1000 ppm or less, more preferably 100 ppm or less. The oxygen-containing substance is water, which exists in the form of vapor. The concentration can be controlled by using a oxygen-adsorbing filter and a water-adsorbing filter provided in the ports 38 and 39, respectively, and by adjusting the concentration of the hydrogen being introduced into the furnace 31.

Then, the hydrogen atmosphere is heated from room temperature (about 25° C.) to about 600° C. at the rate ranging from 100° C./15 min. to 100° C./5 min. Thereafter, the structure is heated the structure is heated at about 600° C. for 110 to 60 minutes, thereby oxidizing the exposed surface region of the yttrium film 34. As shown in FIG. 14, an yttrium oxide film 36 is thereby formed, covering a body 35 of the yttrium film. The oxidizing temperature may range from 300° C. to 1000° C., preferably from 500° C. to 700° C. The rate of temperature rise may range from 100° C./20 min. to 100° C./5 min.

Thereafter, the yttrium oxide film 36 is dehydrogenated. To be more specific, the film 36 is heated at 350° C. or more, preferably 450° C. to 800° C. for 15 minutes in an atmosphere having a pressure reduced to $1 \times 10^{-3}$ Torr or less, preferably $1 \times 10^{-6}$ Torr or less, thereby table 32 in the reaction furnace 31, as is illustrated in FIG. 13. Argon is introduced into the furnace 31 through the gas inlet port 38 such that the furnace 31 is kept filled with argon. It is desirable that the concentration of oxygen and/or oxygen-containing substance be 1% or less by volume, preferably 1000 ppm or less, more preferably 100 ppm or less. The oxygen-containing substance is water, which exists in the form of vapor. The concentration can be controlled by using an oxygen-adsorbing filter and a water-adsorbing filter provided in the ports 38 and 39, respectively, and by adjusting the concentration of the argon being introduced into the furnace 31.

Then, the argon atmosphere is heated from room temperature to about 600° C. at the rate ranging from 100° C./15 min. to 100° C./5 min. The structure is heated at about 600° C. for 10 to 60 minutes, thereby oxidizing the exposed surface region of the yttrium film 34. As shown in FIG. 14, an yttrium oxide film 36 is thereby formed, covering a body 35 of the yttrium film. The rate of temperature rise may range from 100° C./20 min. to 100° C./5 min.

The crystal system of an yttrium oxide film can be changed by adjusting the concentration of the oxygen and/or oxygen-containing substance, as in the first method. The second method was performed on experimental basis. It was found that yttrium oxide films of A-type lattice, AB-type lattice, B-type lattice, BC-type lattice and C-type lattice were formed by the second method.

In the second method the yttrium film is oxidized in an argon atmosphere. Thus, it is different from the first method, in which the film is oxidized in a hydrogen atmosphere. Formed in an argon atmosphere, the yttrium oxide film contains almost no hydrogen. The yttrium oxide film need not be dehydrogenated at all. The second method therefore comprises one less step than the first method. Nonetheless, it is desirable to dehydrogenate the film as in the first method if hydrogen is contained in the yttrium film, though in a small amount.

A third method of manufacturing the electron-emitting electrodes which perform field emission of cold electrons will be explained with reference to FIGS. 13 and 14.

In the present invention, the argon gas can be replaced by any other rare gas, such as helium, neon, krypton, or xenon gas.

The third method comprises the steps of: washing a base plate; forming a metal oxide film on the base plate; heating the metal oxide film for forming a desirable crystal system;

and dehydrogenating the electron-emitting film. These steps are carried out in the order mentioned, thereby providing an electron-emitting electrode which has an electron-emitting film having a predetermined crystal lattice. The base plate is made of electrically conductive material or semiconductor material. The electron-emitting film provided on the base plate contains $R_2O_{3-z}$ (where R is an atom or an atom group of rare earth elements, and O is oxygen, and z is 0.0 to 1.0) and can perform field emission of cold electrons. In the present example, the rare earth element is yttrium (Y).

The third method will now be explained in detail, with reference to FIGS. 13 and 14.

First, the base plate 33 made of an Ni—Cr alloy (INCONEL 601) is washed. A film of amorphous yttrium oxide is then formed on the base plate 33 by ion implantation, to a thickness ranging from 1000 Å to 5000 Å.

Next, the resultant structure consisting of the base plate 33 and the yttrium oxide film is placed in the reaction furnace 31. Hydrogen is introduced into the furnace 31 through the gas inlet port 28 such that the furnace 31 is kept filled with hydrogen. It is desirable that the concentration of oxygen and/or oxygen-containing substance be 1% or less by volume, preferably 1000 ppm or less, more preferably 100 ppm or less. The oxygen-containing substance is water, which exists in the form of vapor. The concentration can be controlled by using an oxygen-adsorbing filter and a water-adsorbing filter provided in the ports 38 and 39, respectively, and by adjusting the concentration of the hydrogen being introduced into the furnace 31.

Then, the hydrogen atmosphere is heated from room temperature to about 600° C. at the rate ranging from 100° C./15 min. to 100° C./5 min. The structure is heated at about 600° C. for 10 to 60 minutes, thereby forming a desirable crystal lattice of the yttrium oxide film. The heating temperature can range from 300° C. to 1000° C., preferably from 500° C. to 700° C. The rate of temperature rise may range from 100° C./20 min. to 100° C./5 min.

This done, the desirable yttrium oxide film is dehydrogenated. To be more specific, the film is heated at 350° C. or more, preferably 450° C. to 800° C. for 15 minutes in an atmosphere having a pressure reduced to $1 \times 10^{-3}$ Torr or less, preferably $1 \times 10^{-6}$ Torr or less, thereby removing the hydrogen from the yttrium oxide film.

Cold-cathode fluorescent lamps manufactured by washing a base plate, forming an yttrium oxide film and heating the film, but not dehydrogenating the resultant yttrium oxide film emitted but bluish white light after one hundred hours of continuous discharge. This is due to the hydrogen contained in the yttrium oxide film. This is why the yttrium oxide film formed in hydrogen atmosphere should be dehydrogenated.

In the manufacture of a cold-cathode fluorescent lamp, impurities such as water are removed from the glass tube before electrodes each having an yttrium oxide film are sealed within the tube. The removal of impurities is accomplished by heating the glass tube at about 400° C. in a pressure-reduced atmosphere. The heating process can indeed serve to remove some amount of hydrogen from the yttrium oxide films. Since the temperature is relatively low (about 400° C.), however, the fluorescent lamp cannot achieve initial discharge so readily as one comprising electrodes each having a dehydrogenated yttrium oxide film. Hence, the yttrium oxide film 36 should be dehydrogenated in a pressure-reduced atmosphere at 450° C. or more.

The third method described above was performed on experimental basis. It was confirmed that yttrium oxide films of A-type lattice, AB-type lattice and B-type lattice were formed by the third method.

A fourth method of manufacturing the electron-emitting electrodes which perform field emission of cold electrons will be explained.

The fourth method comprises the steps of: washing a base plate; forming an under layer on the base plate; forming a metal oxide film on the under layer; heating the metal oxide film to be a desirable crystal system; and dehydrogenating the electron-emitting film. The five steps are carried out in the order mentioned, thereby providing an electron-emitting electrode which has an electron-emitting film having a predetermined crystal lattice. The base plate is made of electrically conductive material or semiconductor material. The electron-emitting film contains $R_2O_{3-z}$ (where R is an atom or an atom group of rare earth elements, and O is oxygen, and z is 0.0 to 1.0) and can emit cold electrons. In this example, too, the rare earth element is yttrium (Y).

The fourth method will now be explained in detail, with reference to FIGS. 13 and 14.

First, the base plate made of an Ni—Cr alloy (INCONEL 601) is washed. An yttrium film, or an conductive under layer, for preventing the base plate oxidizing and for advancement in physical and electrical connection to yttrium oxide is formed on the base plate by vapor deposition (achieved by resistance heating or application of an electron beam) or sputtering, to a thickness ranging from 20000 Å to 40000 Å.

Next, a film of amorphous yttrium oxide film is formed on the yttrium film by ion implantation, to a thickness ranging from 1000 Å to 10000 Å.

Figure 14:
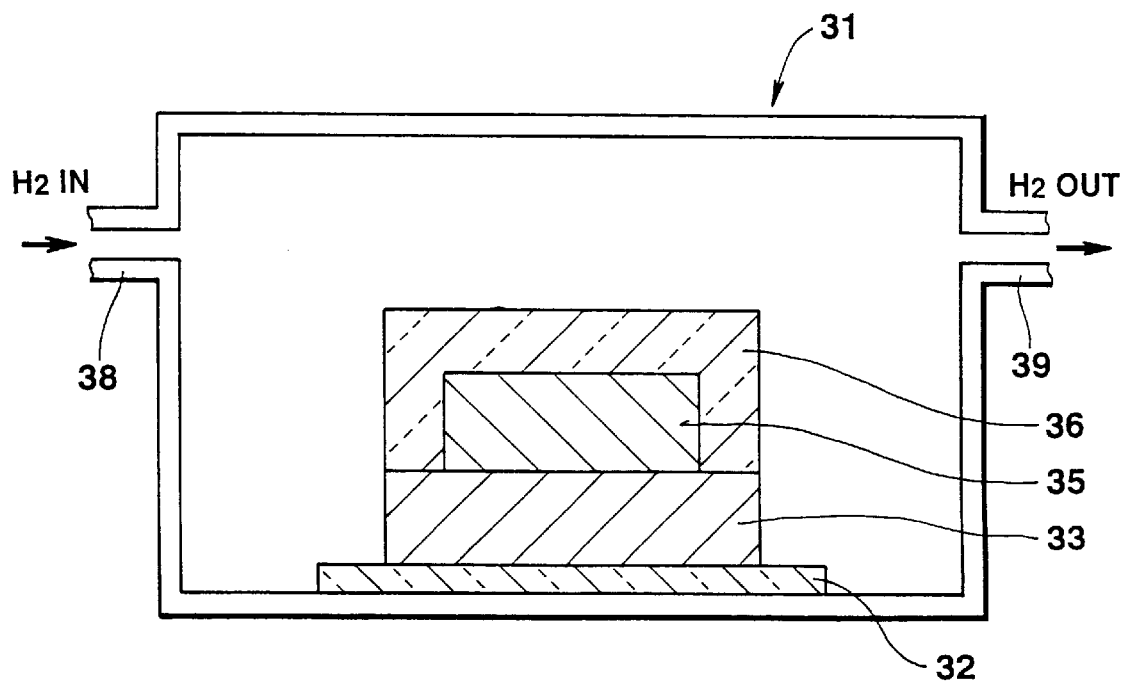
FIG. 14 is a sectional view explaining the step next to the step explained with reference to FIG. 13.

Then, the resultant structure consisting of the base plate, the yttrium film and the amorphous yttrium oxide film is placed on the table 32 in a reaction furnace 31 shown in FIGS. 13 and 14. Hydrogen is introduced into the furnace 31 through the gas inlet port 38 such that the furnace 31 is kept filled with hydrogen. It is desirable that the concentration of oxygen and/or oxygen-containing substance be 1% or less by volume, preferably 1000 ppm or less, more preferably 100 ppm or less. The oxygen-containing substance is water, which exists in the form of vapor. The concentration can be controlled by using an oxygen-adsorbing filter and a water-adsorbing filter mounted in the ports 38 and 39, respectively, and by adjusting the concentration of the hydrogen being introduced into the furnace 31.

The hydrogen atmosphere is heated from room temperature to about 600° C. at the rate ranging from 100° C./15 min. to 100° C./5 min. The structure is heated at about 600° C. for 10 to 60 minutes, thereby oxidizing the amorphous yttrium oxide film. An yttrium oxide film is thereby formed, covering the yttrium oxide film. The oxidizing temperature can range from 300° C. to 1000° C., preferably from 500° C. to 700° C. The rate of temperature rise may range from 100° C./20 min. to 100° C./5 min.

Cold-cathode fluorescent lamps manufactured by washing a base plate, forming an yttrium film and oxidizing the surface region of the film, but not dehydrogenating the resultant yttrium oxide film emitted but bluish white light after one hundred hours of continuous discharge. This is due to the hydrogen contained in the yttrium oxide film. This is why the yttrium oxide film formed in an hydrogen atmosphere should be dehydrogenated.

In the manufacture of a cold-cathode fluorescent lamp, impurities such as water are removed from the glass tube before electrodes each having an yttrium oxide film are sealed within the tube. The removal of impurities is accomplished by heating the glass tube at about 400° C. in a pressure-reduced atmosphere. The heating process can indeed serve to remove some amount of hydrogen from the yttrium oxide films. Since the temperature is relatively low (about 400° C.), however, the fluorescent lamp cannot achieve initial discharge so readily as one comprising electrodes each having a dehydrogenated yttrium oxide film. Hence, the yttrium oxide film 36 should be dehydrogenated in a pressure-reduced atmosphere at 450° C. or more.

The fourth method described above was performed on experimental basis. It was confirmed that yttrium oxide films of A-type lattice, AB-type lattice and B-type lattice were formed.

A fifth method of manufacturing the electron-emitting electrodes which perform field emission of cold electrons will be explained.

The fifth method comprises the steps of: washing a base plate; forming an under layer on the base plate; forming a metal oxide film on the under layer; and heating the metal oxide film to be a desirable crystal system. The four steps are carried out in the order mentioned, thereby providing an electron-emitting electrode which has an electron-emitting film having a predetermined crystal lattice. The base plate is made of electrically conductive material or semiconductor material. The electron-emitting film contains $R_2O_{3-z}$ (where R is an atom or an atom group of an rare earth element, and O is oxygen, and z is 0.0 to 1.0) and can perform field emission of cold electrons. In this example, too, the rare earth element is yttrium (Y).

The fifth method will now be explained in detail, with reference to FIGS. 13 and 14.

First, the base plate 33 made of an Ni—Cr alloy (INCONEL 601) is washed. An yttrium film, or a conductive under layer, for preventing the base plate oxidizing, and for advancement in physical and electrical connections to yttrium oxide is formed on the base plate by vapor deposition (achieved by resistance hating or application of an electron beam) or sputtering, to a thickness ranging from 20000 Å to 40000 Å.

Then, a film of amorphous yttrium oxide film is formed on the yttrium film by ion implantation, to a thickness ranging from 500 Å to 2000 Å.

This done, the resultant structure consisting of the base plate, the yttrium film and the amorphous yttrium oxide film is placed in the reaction furnace 31 shown in FIGS. 13 and 14. Argon is introduced into the furnace 31 through the gas inlet port 38 such that the furnace 31 is kept filled with argon. It is desirable that the concentration of oxygen and/or oxygen-containing substance be 1% or less by volume, preferably 1000 ppm or less, more preferably 100 ppm or less. The oxygen-containing substance is water, which exist in the form of vapor. The concentration can be controlled by using a oxygen-adsorbing filter and a water-adsorbing filter mounted in to the ports 38 and 39, respectively, and by adjusting the concentration of the argon being introduced into the furnace 31.

The argon atmosphere is heated from room temperature to about 600° C. at the rate ranging from 100° C./15 min. to 100° C./5 min. The structure is heated at about 600° C. for 10 to 60 minutes, thereby oxidizing the amorphous yttrium oxide film. An an yttrium oxide film (i.e., an electron-emitting film) is thereby formed. The oxidizing temperature can range from 300° C. to 1000° C., preferably from 500° C. to 700° C. The rate of temperature rise may range from 100° C./20 min. to 100° C./5 min.

Thereafter, the yttrium oxide film (i.e., the electron-emitting film) is dehydrogenated. More precisely, the film is heated at 350° C. or more, preferably 450° C. to 800° C. for 15 minutes in an atmosphere having a pressure reduced to $1 \times 10^{-3}$ Torr or less, preferably $1 \times 10^{-6}$ Torr or less, thereby removing the hydrogen from the yttrium oxide film.

In the fifth method the yttrium film is oxidized in an argon atmosphere. Thus, it is different from the fourth method, in which the film is oxidized in a hydrogen atmosphere. Formed in an argon atmosphere, the yttrium oxide film contains almost no hydrogen. The yttrium oxide film need not be dehydrogenated at all. This method therefore comprises one less step than the first method. Nonetheless, it is desirable to dehydrogenated the film as in the first method if hydrogen is contained in the yttrium film, though in a small amount.

The fifth method described above was performed on experimental basis. It was confirmed that yttrium oxide films of A-type lattice, AB-type lattice and B-type lattice were formed. Which type was formed depended on the oxygen concentration in the oxidizing atmosphere. When oxidized, an yttrium oxide film having a thickness of about 1000 Å changed to an yttrium oxide film of A-type lattice when the oxygen concentration was in the order of the 100 ppm, and to an yttrium oxide film of B-type lattice when the oxygen concentration was in the order of 10 ppm.

Two types of cold-cathode fluorescent lamps, each having a pair of electron-emitting electrodes made by the fifth method were manufactured. The first type comprised electrodes each having an A-type yttrium oxide film, and the second type comprised electrodes each having an AB-type yttrium oxide film. These lamps were tested for their emission characteristics. The results were as specified in Table 3 presented below. Also shown in Table 3 is the emission characteristic of a conventional cold-cathode fluorescent lamp incorporating Ni-type electron-emitting electrodes.

TABLE 3

| electrodes | lamp current IL (mA) | lamp voltage VL (V) | luminance (cd/m²) | luminous flux F (lm) | luminous efficiency (lm/(V · A)) | conductivity | improvement in lamp voltage over Ni-type (%) |
|---|---|---|---|---|---|---|---|
| A-type | 5.0 | 185 | 26000 to 29000 | 25 to 26 | 27.0 to 28.1 | Δ | +18 |
| AB-type | 5.0 | 170 | 26000 to 29000 | 25 to 26 | 29.4 to 30.6 | ◯ | +24 |
| Ni-type | 5.0 | 225 | 24000 to 25000 | 23.5 to 24.5 | 20.9 to 21.8 | ◯ | — |

As evident from Table 3, the cold-cathode fluorescent lamps having the A-type and the AB-type electrodes are superior to the conventional lamp in terms of luminance and luminous efficiency, in spite of the relatively low discharge voltage, though they are slightly inferior to lamps having B-type electrodes, lamps having BC-electrodes and lamps having C-type electrodes. Further, both the lamp having the A-type electrodes and the lamp having the AB-type electrodes exhibited high electrical conductivity. In addition, they had much low sputtering property than the conventional lamp which had Ni-type electron-emitting electrodes. They did continuously emit light for a loner time than the conventional cold-cathode fluorescent lamp.

The A-type electrode, the AB-type electrode and the B-type electrode, all made by the first and second methods described above, exhibited emission characteristics similar to those of the A-type electrode, the AB-type electrode and the B-type electrode, respectively, which had been manufactured by the third, fourth and fifth methods.

From Tables 1, 2 and 3 it is understood that the electron-emitting films containing yttrium oxide differ a little in electron-emitting property, in accordance with their crystal systems, A-type lattice, AB-type lattice, B-type lattice, BC-type lattice or c-type lattice. The electron-emitting films had a resistivity of 100000 Ω cm or less.

In the second and fifth methods of manufacturing the electron-emitting electrodes in argon gas, the crystal lattice of rare earth element is affected by a existence of a small quantity of hydrogen. Since the hydrogen gas tends to diffuse oxygen in the furnace, it is desirable to manufacture a single film of the rare earth element of better crystal lattice. Therefore the second and fifth methods may perform in a mixture of hydrogen gas and rare gas such as argon gas.

Figure 24:
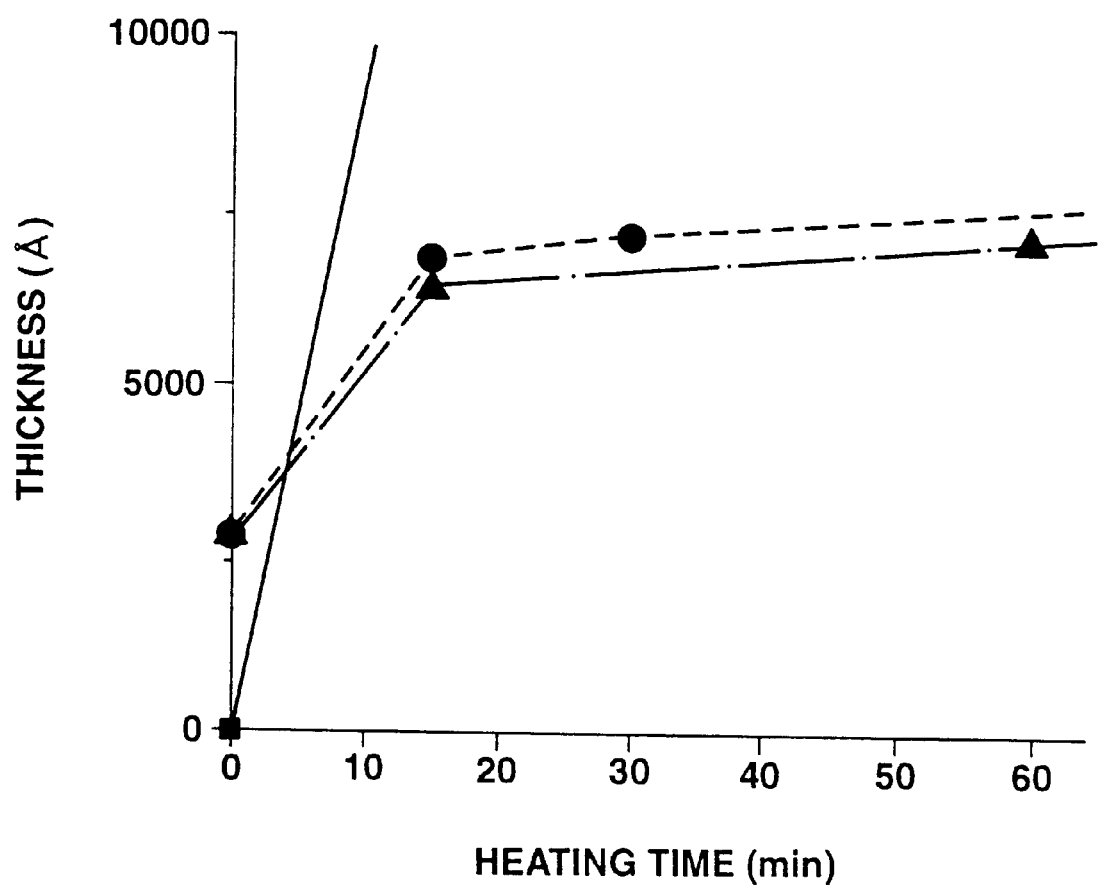
FIG. 24 is a diagram representing the relationship between the time spent to heat an yttrium film and an yttrium compound and the thickness of the yttrium oxide film formed by heating the yttrium film.

FIG. 24 represents the relationship between the time spent to heat yttrium films and the thickness of each yttrium oxide films formed by heating one yttrium film. The thickness of the oxide film is plotted on the ordinate, and the heating time on the abscissa. In FIG. 24, the solid line indicates how an oxide film gradually grew while an yttrium film was being oxidized in the first method described above. The broken line shows how an yttrium oxide film did grow as an yttrium oxide film deposited to a thickness of 3000 Å on an yttrium film about 27000 Å thick by ion implantation was oxidized in the atmosphere. The dash-dotted line indicates how an yttrium oxide film did grow as an yttrium oxide film deposited to a thickness of 3000 Å on an yttrium film about 27000 Å thick by ion implantation was oxidized in an atmosphere of a mixture gas consisting of 79 vol. % of argon and 21 vol. % of oxygen.

As FIG. 24 reveals, the yttrium film was oxidized at high rate in the hydrogen atmosphere (the first method) despite that the oxygen concentration was very low.

An yttrium film 1000 Å to 3000 Å thick was formed on a base plate by resistance heating or by application of an electron beam. The yttrium film was heated from room temperature to about 600° C. at the rate ranging from 100° C./15 min. to 100° C./5 min, in an atmosphere which had a pressure reduced to 1×10$^{-3}$ Torr to 1×10$^{-6}$ Torr and in which the oxygen concentration was very low. An yttrium oxide film of A-type lattice was thereby formed. AB-type yttrium oxide film, a BC-type yttrium oxide film or a C-type yttrium oxide film, which has good electron-emitting property was not formed at all. When an yttrium film was oxidized in an atmosphere of a mixture gas consisting of 79 vol. % of argon and 21 vol. % of oxygen, too, an A-type yttrium oxide film was formed.

The electron-emitting films which grew in thickness as shown in FIG. 24 exhibited a resistivity of 10000 Ω cm or less.

A method of manufacturing an electron-emitting electrode wherein R in "$R_2O_{3-z}$" is lanthanum (La) will be explained, with reference to FIGS. 13 and 14.

At first, the base plate made of an Ni—Cr alloy (INCONEL 601) is washed. A lanthanum film is formed on the base plate by vapor deposition (achieved by resistance hating or application of an electron beam) or sputtering, to a thickness ranging from 3000 Å to about 6000 Å.

This done, the resultant structure consisting of the base plate and the lanthanum film is introduced into the reaction furnace 31 shown in FIGS. 13 and 14 and mounted on the table 23. Hydrogen is introduced into the furnace 31 through the gas inlet port 38 such that the furnace 31 is kept filled with hydrogen. It is desirable that the concentration of oxygen and/or oxygen-containing substance be 1% or less by volume, preferably 1000 ppm or less, more preferably 100 ppm or less. The oxygen-containing substance is water, which exist in the form of vapor. The concentration can be controlled by using a oxygen-adsorbing filter and a water-adsorbing filter connected to the ports 38 and 39, respectively, and by adjusting the concentration of the argon being introduced into the furnace 31.

The hydrogen atmosphere is heated from normal temperature to about 600° C. at the rate ranging from 100° C./15 min. to 100° C./5 min. The structure is heated at about 600° C. for 10 to 60 minutes, thereby oxidizing the surface region of the lanthanum film. A lanthanum oxide film (i.e., an electron-emitting film) is thereby formed, covering the lanthanum film. The oxidizing temperature can range from 300° C. to 1000° C., preferably from 500° C. to 700° C. The rate of temperature rise may range from 100° C./20 min. to 100° C./5 min.

Thereafter, the lanthanum oxide film (i.e., the electron-emitting film) is dehydrogenated. More precisely, the film is heated at 350° C. or more, preferably 450° C. to 800° C. for 15 minutes in an atmosphere having a pressure reduced to 1×10$^{-3}$ Torr or less, preferably 1×10$^{-6}$ Torr or less, thereby removing the hydrogen from the lanthanum oxide film.

Cold-cathode fluorescent lamps having electrodes each having a lanthanum oxide film were made and tested to determine how their discharge characteristics. They were found inferior in discharge characteristic to the cold-cathode fluorescent lamps provided with electrodes each having an yttrium oxide film. Nevertheless, they were superior to the lamps comprising Ni-type electron-emitting electrodes, not only in discharge characteristic but also in luminance and luminous efficiency.

In the first to fifth methods explained above, yttrium and lanthanum can be replaced by any other rare earth element. More specifically, scandium (Sc), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) or lutetium (Lu) can be used instead of yttrium (Y) and lanthanum (La).

Figure 25:
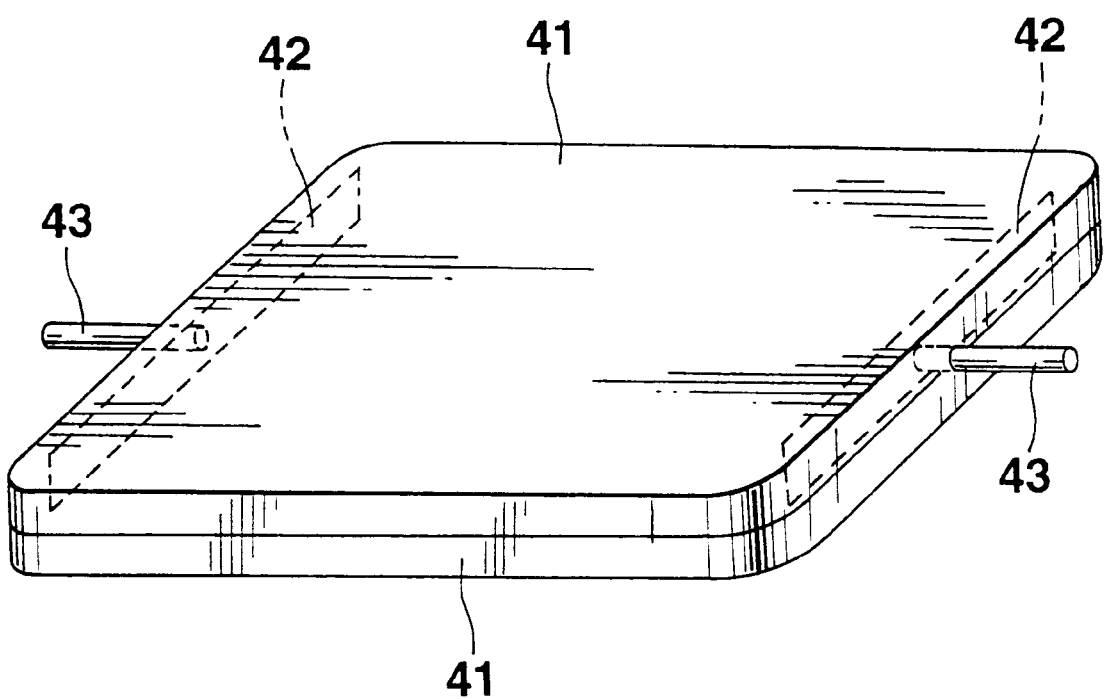
FIG. 25 is a perspective view of another cold-cathode fluorescent lamp according to the invention.

All the cold-cathode fluorescent lamps described above are straight tubes. Nonetheless, the present invention can be applied to cold-cathode fluorescent lamps of other shapes. For instance, the invention can be applied to a planar one of the type illustrated in FIG. 25. As shown in FIG. 25, this cold-cathode fluorescent lamp comprises a pair of glass plates 41, connected together, one on the other, defining a closed space between them. The closed space is filled with an inert gas (e.g., argon) and mercury vapor. The inner surface of each glass plate 41 is coated with a fluorescent material. The fluorescent material emits visible light within a predetermined wavelength range when excited with ultraviolet rays generated as electrons impinging upon the mercury atoms. A pair of electron-emitting electrodes 42, both shaped like a strip, are located within the closed space, opposing each other and connected to two wires 43, respectively.

Figure 26:
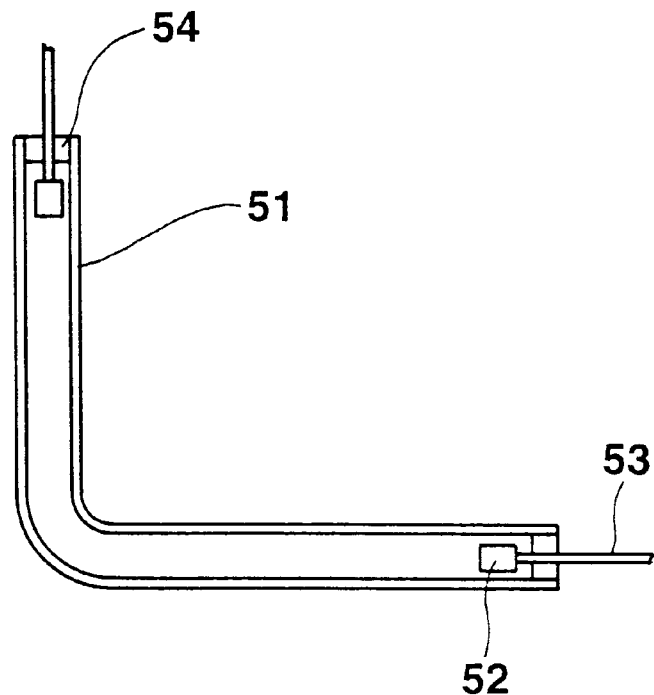
FIG. 26 is a view of still another cold-cathode fluorescent lamp according to the invention.
Figure 27:
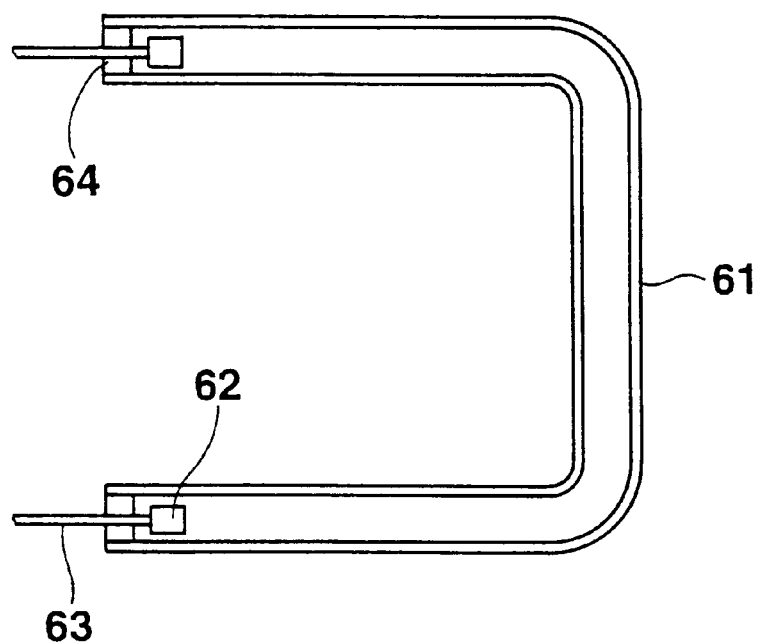
FIG. 27 is a perspective view of a cold-cathode fluorescent lamp according to the invention.
Figure 28:
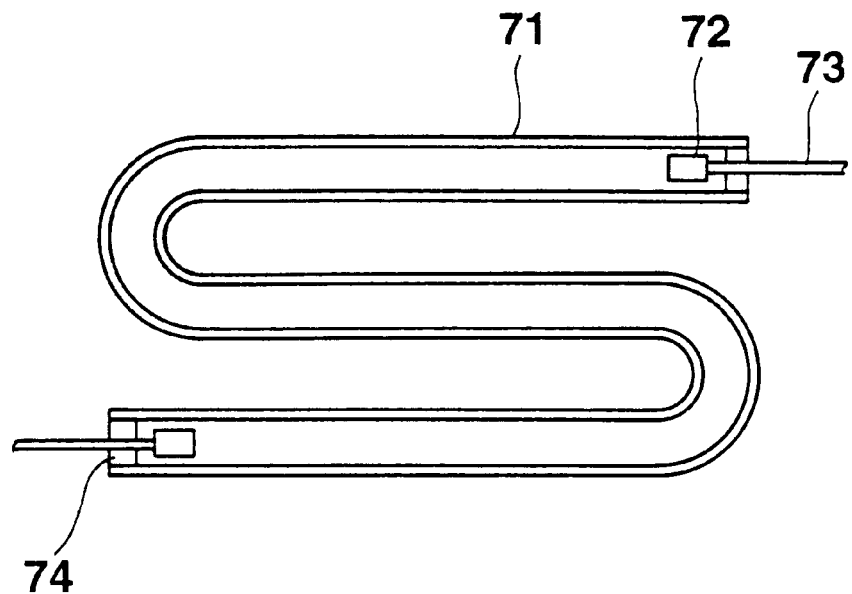
FIG. 28 is a perspective view of another cold-cathode fluorescent lamp according to the invention.

Moreover, the present invention can be applied to an L-shaped cold-cathode fluorescent lamp, a U-shaped cold-cathode fluorescent lamp, and an S-shaped cold-cathode fluorescent lamp shown in FIGS. 26, 27 and 28, respectively. The L-shaped lamp comprises an L-shaped glass tube 51, a pair of electron-emitting electrodes 52 located in the end portions 54 of the tube 51, and two wires 53 respectively connected to the electrodes 52. The U-shaped lamp comprises a U-shaped glass tube 61, a pair of electron-emitting electrodes 62 located in the end portions 64 of the tube 61, and two wires 63 respectively connected to the electrodes 62. The S-shaped lamp comprises an S-shaped glass tube 71, a pair of electron-emitting electrodes 72 located in the end portions 74 of the tube 71, and two wires 73 respectively connected to the electrodes 72. The electrodes 52, 62 and 72 have an electron-emitting film each, which is of a rare-earth oxide, so that the fluorescent layer coated on the inner surface of the glass tubes may emit light.

Figure 29:
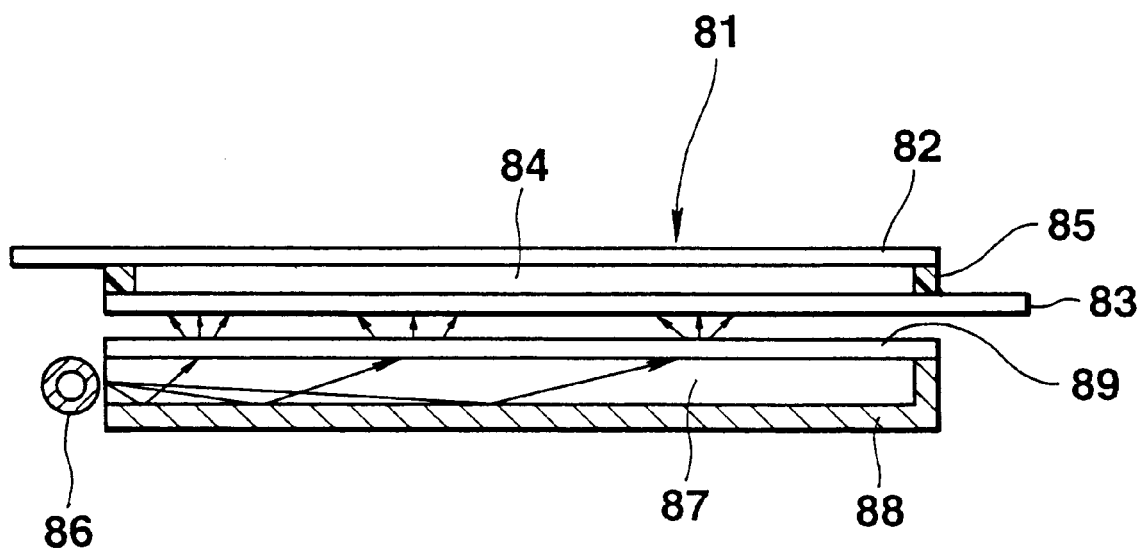
FIG. 29 is a sectional view of a liquid crystal display panel incorporating a cold-cathode fluorescent lamp according to the present invention.

The cold-cathode fluorescent lamps described above can be used as the white-emitting back lights in liquid crystal display panels. FIG. 29 shows a liquid crystal display panel 81 incorporating a cold-cathode fluorescent lamp 86 of the invention. As seen from FIG. 29, the panel 81 comprises two transparent substrates 82 and 83 spaced apart from each other, a frame-shaped seal 85 interposed between the substrates 81 and 83 and connecting them together at their edges, TN or STN liquid crystal 84 filled in the space defined by both substrates 81 and 82 and the seal 85. Each transparent substrate is made of glass or organic film and has an electrode or electrodes on the surface opposing the other transparent substrate. The liquid crystal panel 81 may be driven by switching elements such as TFTs.

Located at one side of the liquid crystal panel 81 is a straight, tubular cold-cathode fluorescent lamp 86. A light-guiding plate 87 is provided beside the lamp 86 and below the liquid crystal panel 81, for guiding the light from the lamp 86 to the back of the panel 81. The plate 87 is made of acrylic resin. Provided on the surrounding surface except an upper surface and a surface opposite the lamp 86 of the plate 87 are a light-reflecting layer 88 and on the upper surface of the plate 87 is a light-diffusing layer 89.

Figure 30:
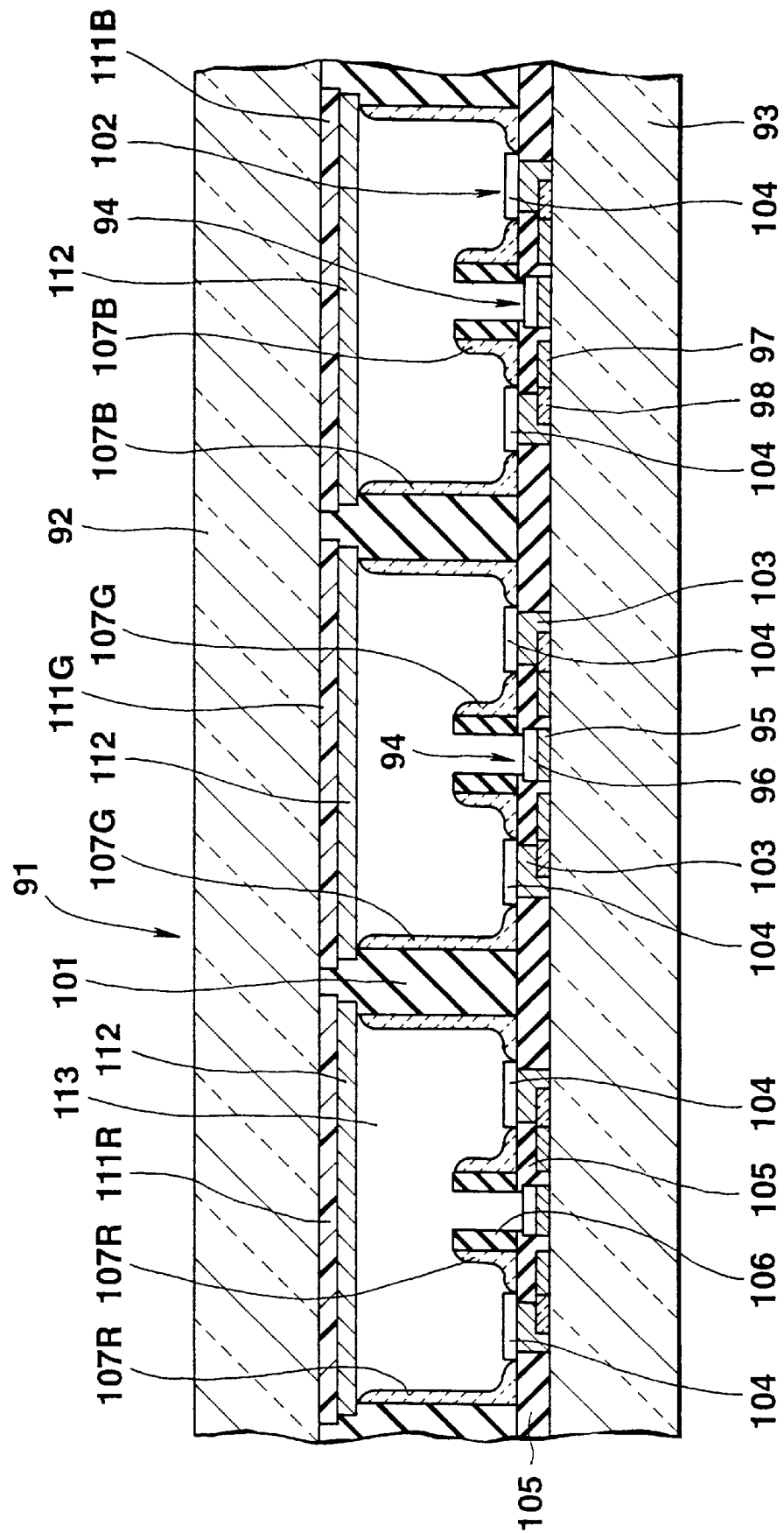
FIG. 30 is a sectional view of a PDP incorporating electron-emitting electrodes according to the present invention.

The electron-emitting electrodes according to the present invention can be used in a DC-driven PDP of the type shown in FIG. 30.

As shown in FIG. 30, the PDP 91 has red-emitting pixels, green-emitting pixels and blue-emitting pixels which are arranged in a plane, in rows and columns. The pixels are isolated from one another by barriers 101 which are interposed between a transparent upper substrate 92 and a transparent lower substrate 93. The barriers 101 including a material being opaque to visible ray, are constructed by a plurality of strips or one lattice. Auxiliary cathodes 94 are arranged on the lower substrate 93, in rows and columns, each positioned at the center of a pixel. Each auxiliary cathode 94 is a two-layer member, comprised of a base layer 95 and an electron-emitting film 96 mounted on the layer 95. The base layer 95 is made of at least one conductive material having a small work function such as Y, Ni, Cr, Al and Mo. The film 96 is made of yttrium oxide (a rare-earth oxide). The yttrium oxide is selected from those whose crystal systems are A-type lattice, AB-type lattice, B-type lattice, BC-type lattice and C-type lattice. Of these yttrium oxides, ones whose crystal systems are B-type lattice, BC-type lattice and C-type lattice are preferred.

As shown in FIG. 30, data electrodes 97 are provided on the lower substrate 93 surrounding auxiliary cathodes 94. Also provided on the lower substrate 93 are current control films 98 made of amorphous silicon or the like surrounding the data electrodes 97. Provided also on the lower substrate 93 are cathodes 102 surrounding current control films 98 and covering the outer circumferential edge thereof. Each cathode 102 is a two-layer member composed of a base layer 103 and an electron-emitting film 104 formed on the layer 103. The base layer 103 is made of at least one conductive material such as Y, Ni, Cr, Al and Mo. The electron-emitting film 104 is made of yttrium oxide (a rare-earth oxide). The yttrium oxide is selected from those whose crystal systems are A-type lattice, AB-type lattice, B-type lattice, BC-type lattice and C-type lattice. Of these yttrium oxides, ones whose crystal systems are B-type lattice, BC-type lattice and C-type lattice are preferred.

The current control films 98 control the current supplied to the cathodes 102, in order to suppress the sputtering of the cathodes 102. The films 98 can have a desired resistance by adjusting their thickness and length and by selecting an appropriate impurity to be added to the amorphous silicon.

As illustrated in FIG. 30, an insulating film 105 is substantially provided on the entire surface of the lower substrate 93, except those portions covered with the electron-emitting films 96 of the auxiliary cathodes 94 and the electron-emitting films 104 of the cathodes 102. Auxiliary barriers 106 are provided on those portions of the insulating film 105, which surround the auxiliary cathodes 94. A red-emitting fluorescent layers 107A, a green-emitting fluorescent layers 107G, and a blue-emitting fluorescent layers 107B are provided on the barrier 101 and the auxiliary barrier 106, for each pixel.

The red-emitting fluorescent layer 107R is made of (Y, Gd)BO$_3$:Eu$^{3+}$ or Y$_2$O$_3$:Eu$^{3+}$. The green-emitting fluorescent layer 107G is made of Zn$_2$SiO$_4$:Mn or BaAl$_{12}$O$_{19}$:Mn. The blue-emitting fluorescent layer 107B is made of BaMgAl$_{14}$O$_{23}$:Eu$^{2+}$ or SrMg(SiO$_4$)$_2$:Eu$^{2+}$.

Provided on the upper substrate 92 are color filters 111R, 111G and 111B for passing only red light, green light and blue light, respectively. The filters 111R, 111G and 111B are covered with transparent electrodes 112 which are made of ITO. The spaces defined by the upper substrate 92, the lower substrate 93 and the barriers 101 are filled with a rare gas such as He or Xe.

How the PDP 91 is driven will be explained.

First, a predetermined voltage is applied between the transparent electrode 112 and the auxiliary cathode 94 to generate an auxiliary plasma therebetween.

Next, a data voltage is applied to the data electrode 97 of each pixel. As a result, a controlled current flows from the current control film 98 to the cathode 102. A plasma is readily generated between the cathode 102 and the transparent electrode 112, owing to assist of the auxiliary plasma. The plasma excites the rare gas, which generates ultraviolet rays. The ultraviolet rays are applied to the fluorescent layers provided on the barriers 101 and the auxiliary barrier 106. The fluorescent layers emit light falling within a predetermined wavelength range. The light passes through the upper substrate 92, whereby each pixel emits a light beam to perform a display.

When external light beams incident into the PDP 91, they are emitted outside through the color filters 111R, 111G and 111B as a red light beam, a green light beam and a blue light beam, respectively. These light beams combine with the light beams emitted from the fluorescent layers 107R, 107G and 107B, respectively. As a result, the light beams emitted from the PDP 91 have sufficiently deep hues. In addition, since each of the color filters 111R, 111G and 111B absorbs the external light except light with respective predetermined wave length, the external light is not much to reflected from the display surface of the PDP 91. This suppresses the flickering on the display surface, whereby the PDP 91 displays clear color images.

The display surface of the PDP 91 may be covered with a liquid crystal panel which functions as a light shutter. In this case, the PDP 91 can display images at minute gray-scale levels.

No fluorescent layers may be used in the PDP 91 which has electron-emitting electrodes each having an yttrium oxide film. If this is the case, the pixels of the PDP 91 will emit orange light emanating from the plasma, not light beams of different colors.

In the PDP 91, yttrium can be replaced by any other rare earth element or elements. More correctly, scandium (Sc), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) or lutetium (Lu) can be used instead of yttrium (Y). Furthermore, the material of the base layers 95 and 103 are not limited to Y, Ni, Cr, Al and Mo. Rather, they can be made of any other material that has a smaller work function than the transparent electrodes 112 of the anodes.

As described above, the electrodes 94, 102 can suppress the sputtering themselves, and can emit a large quantity of electrons with low voltage.

Figure 31:
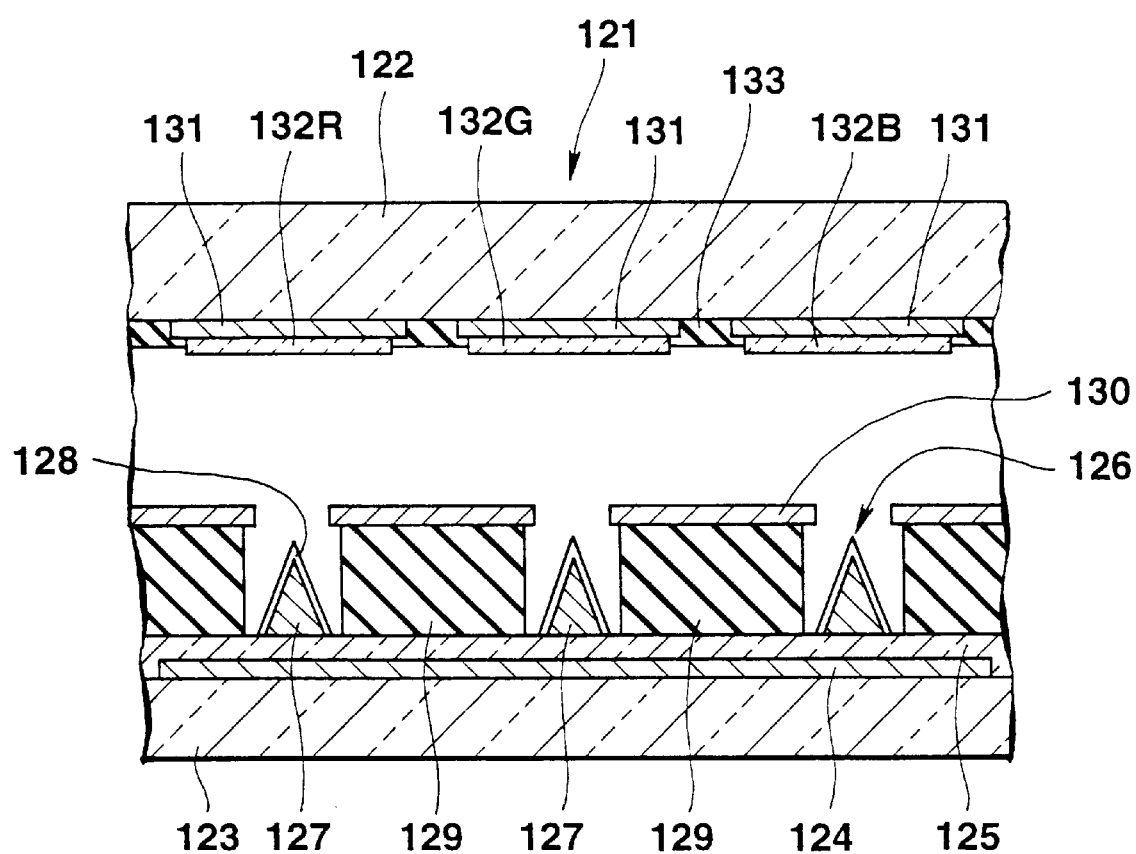
FIG. 31 is a sectional view of a FED incorporating electron-emitting electrodes according to the present invention.

The electron-emitting electrodes according to the present invention can be used in an FED of the type shown in FIG. 31, too.

As shown in FIG. 31, the FED 121 has red-emitting pixels, green-emitting pixels and blue-emitting pixels which are arranged in a plane, in rows and columns. The pixels are isolated from one another by barriers which are interposed between a transparent upper substrate 122 and a transparent lower substrate 123. The barriers are constructed by a plurality of strips or a lattice. Data electrodes 124 to which luminance data voltages are applied are provided on the lower substrate 123. A current control film 125 made of amorphous silicon is provided on the data electrodes 124. Conical cold cathodes 126 are arranged on the current control film 125 in rows and columns. About 2000 cold cathodes 126 are provided for each pixel. Each cold cathode 126 is a two-layer member, composed of a conical base 127 and an electron-emitting film 128 which covers the base 127 entirely, but the bottom thereof. The base 127 is made of at least one conductive material having a small work function such as Y, Ni, Cr, Al and Mo. The electron-emitting film 128 is made of yttrium oxide (a rare-earth oxide). The cold cathodes 126 are electrically isolated from one another by insulating films 129. A gate electrode 130 is provided on the insulating films 129. The gate electrode 130 has openings, such that the apices of the conical cold cathodes 126 facing to the upper substrate. The yttrium oxide is selected from those whose crystal systems are A-type lattice, AB-type lattice, B-type lattice, BC-type lattice and C-type lattice. Of these yttrium oxides, ones whose crystal systems are B-type lattice, BC-type lattice and C-type lattice are preferred.

The current control film 125 controls the current supplied to the cold cathodes 126, in order to suppress the sputtering of the cathodes 126. The film 125 can have a desired resistance by adjusting its thickness and length and by selecting an appropriate impurity to be added to the amorphous silicon.

On the transparent upper substrate 122 there are provided transparent anodes 131 made of ITO opposing the conical cold cathodes 126, respectively. Red-emitting fluorescent layers 132R are mounted on some of the anodes 131, green-emitting fluorescent layers 132G are mounted on some other anodes 131, and blue-emitting fluorescent layers 132B are mounted on the remaining anodes 131.

How the FED 121 is driven will now be explained.

At first, a data voltage for the pixels is applied between the transparent anodes 131 on the one hand and the data electrode 124 on the other hand. The current which has controlled by the current control film 125 flows from the data electrode 124 to the conical bases 127 of the cold cathodes 126. At the same time, a selecting voltage is applied to the gate electrode 130. The gate electrode 130 selects some of the cold cathodes 126. The electron-emitting film or films 128 of any cold cathode or cathodes 126 selected emit electrons in accordance with the data voltage.

The transparent anodes 131, on which a described voltage is applied, attract the electrons emitted from the selected cold cathodes 126. Therefore, the electrons impinge upon the fluorescent layers 132R, 132G and 132B provided on the transparent anodes 131. Excited with the electrons, the fluorescent layers 132R, 132G and 132B emit visible light beams. The visible light beams pass outwardly through the transparent upper substrate 122. As a result, the FED 121 displays a color image.

The display surface of the FED 121 may be covered with a liquid crystal panel which functions as a light shutter. In this case, the FED 121 can display images at minute gray-scale levels.

The electron-emitting electrodes each having an yttrium oxide film can be incorporated in monochromatic FEDs.

In the FED 121, yttrium can be replaced by any other rare earth element. More correctly, scandium (Sc), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) or lutetium (Lu) can be used instead of yttrium (Y). Moreover, the material of the bases 127 is not limited to Y, Ni, Cr, Al and Mo. Rather, they can be made of any other material that has a smaller work function than the transparent anode 131.

As described above, the electrodes 126 can suppress the sputtering itself, and can emit a large quantity of electrons with low voltage.

What is claimed is:

1. A method of manufacturing a cold-cathode for a discharging device, comprising the steps of:

forming on a base plate a film containing a rare earth element; and oxidizing said rare earth element of said film.

2. The method according to claim 1, wherein said oxidizing step comprises oxidizing said rare earth element in a gas atmosphere containing oxygen and/or oxygen-containing substance in a concentration of 1% or less by volume.

3. The method according to claim 2, wherein said oxygen-containing substance is $H_2O$.

4. The method according to claim 1, wherein said oxidizing step comprises heating said rare earth element of said film.

5. The method according to claim 4, wherein said heating is to a temperature ranging from 300° C. to 1000° C.

6. The method according to claim 4, wherein said heating step comprises a sub-step of heating said rare earth element of said film in an atmosphere including hydrogen and a sub-step of dehydrogenating said rare earth oxide film including hydrogen.

7. The method according to claim 6, wherein said dehydrogenating sub-step includes a step of heating said rare earth oxide film in a pressure-reduced atmosphere.

8. The method according to claim 1, wherein said film is formed by vapor deposition.

9. The method according to claim 1, wherein said film is formed by sputtering.

10. The method according to claim 1, wherein said oxidizing step is carried out in a hydrogen and/or rare gas atmosphere.

11. The method according to claim 1, wherein said film is a metal film made substantially only of yttrium, and said rare earth oxide film has a composition of $Y_2O_{3-z}$, where Y is yttrium, O is oxygen, and z is 0.0 to 1.0.

12. A method of manufacturing a cold-cathode for a discharging device, comprising the steps of:

forming on a base plate a film containing a rare earth element; and heating said rare earth element of said film in a gas atmosphere containing oxygen and/or oxygen-containing substance in a concentration of 1% or less by volume, so as to oxidize said rare earth element.

* * * * *